United States Patent
Jiang et al.

(10) Patent No.: US 11,417,143 B2
(45) Date of Patent: Aug. 16, 2022

(54) FINGERPRINT DETECTION APPARATUS AND METHOD AND ELECTRONIC DEVICE

(71) Applicant: SHENZHEN GOODIX TECHNOLOGY CO., LTD., Shenzhen (CN)

(72) Inventors: Peng Jiang, Shenzhen (CN); Ming Ma, Shenzhen (CN)

(73) Assignee: SHENZHEN GOODIX TECHNOLOGY CO., LTD., Shenzhen (CN)

(*) Notice: Subject to any disclaimer, the term of this patent is extended or adjusted under 35 U.S.C. 154(b) by 106 days.

(21) Appl. No.: 17/027,679

(22) Filed: Sep. 21, 2020

(65) Prior Publication Data
US 2021/0056284 A1 Feb. 25, 2021

Related U.S. Application Data

(63) Continuation of application No. PCT/CN2019/102366, filed on Aug. 23, 2019.

(51) Int. Cl.
G06K 9/00 (2022.01)
G06V 40/12 (2022.01)
G06V 40/13 (2022.01)

(52) U.S. Cl.
CPC ...... G06V 40/1335 (2022.01); G06V 40/1312 (2022.01)

(58) Field of Classification Search
CPC .... G06V 40/12; G06V 40/13; G06V 40/1335; G06V 40/1312
See application file for complete search history.

(56) References Cited

U.S. PATENT DOCUMENTS 8,340,362 B2 12/2012 Arai et al.
8,466,040 B2 6/2013 Park
(Continued)

FOREIGN PATENT DOCUMENTS

CN 103198289 A 7/2013
CN 103260045 A 8/2013
(Continued)

OTHER PUBLICATIONS

Li, C., "A Polarized Imaging System For Multimodal Finger-Feature Acquisition", China Master's Theses Full-text Database—Information Science and Technology, Jul. 15, 2015, vol. 2015, Issue 07.
(Continued)

*Primary Examiner* — Lixi C Simpson
(74) *Attorney, Agent, or Firm* — Scully Scott Murphy & Presser

(57) ABSTRACT

Provided are a fingerprint detection apparatus and method and an electronic device, which can improve the detection and identification effect of fingerprint detection when a distance between the optical fingerprint detection apparatus and a display screen changes, thereby improving user experience. The fingerprint detection apparatus is configured to be disposed below a display screen of an electronic device, and includes: a pixel array including a plurality of groups of pixels, the plurality of groups of pixels being configured to respectively receive light signals in multiple directions to obtain multiple images; and a processing unit configured to move the multiple images for combination to form a reconstructed image, and adjust moving distances of the multiple images according to a quality parameter of the reconstructed image to form a target reconstructed image, the target reconstructed image being a fingerprint image of the finger for fingerprint identification.

20 Claims, 22 Drawing Sheets

(56) References Cited

U.S. PATENT DOCUMENTS

| | | |
|---|---|---|
| 10,474,867 B2 | 11/2019 | Yazdandoost et al. |
| 10,503,947 B2 | 12/2019 | Liu et al. |
| 10,593,719 B2 | 3/2020 | Park et al. |
| 2008/0240523 A1* | 10/2008 | Benkley ............. G06V 40/1335 382/126 |
| 2010/0067757 A1 | 3/2010 | Arai et al. |
| 2010/0197071 A1 | 8/2010 | Park |
| 2013/0169780 A1 | 7/2013 | Wu |
| 2016/0188950 A1 | 6/2016 | Liu et al. |
| 2018/0040675 A1 | 2/2018 | Zeng et al. |
| 2018/0301494 A1 | 10/2018 | Park et al. |
| 2018/0366593 A1 | 12/2018 | Huang et al. |
| 2019/0033976 A1 | 1/2019 | Cao et al. |
| 2019/0095672 A1 | 3/2019 | Yazdandoost et al. |
| 2019/0147214 A1 | 5/2019 | Lee et al. |
| 2019/0156097 A1 | 5/2019 | Liu et al. |
| 2019/0171861 A1 | 6/2019 | Zhang et al. |
| 2019/0180071 A1 | 6/2019 | Kim |
| 2019/0228203 A1 | 7/2019 | Kim et al. |
| 2019/0228204 A1* | 7/2019 | Park ................... G06V 40/1324 |
| 2019/0348457 A1 | 11/2019 | Park et al. |
| 2020/0042762 A1* | 2/2020 | Fu ..................... H04N 5/35536 |
| 2020/0292741 A1* | 9/2020 | Rhee ................... G06F 3/04182 |

FOREIGN PATENT DOCUMENTS

| | | | | |
|---|---|---|---|---|
| CN | 104392227 A | 3/2015 | | |
| CN | 104465681 A | 3/2015 | | |
| CN | 104681572 A | 6/2015 | | |
| CN | 104794433 A | 7/2015 | | |
| CN | 104978555 A | 10/2015 | | |
| CN | 105893917 A | 8/2016 | | |
| CN | 105956545 A | 9/2016 | | |
| CN | 106127000 A | 11/2016 | | |
| CN | 106200882 A | 12/2016 | | |
| CN | 106298859 A | 1/2017 | | |
| CN | 206058224 U | 3/2017 | | |
| CN | 106773273 A | 5/2017 | | |
| CN | 107122742 A | 9/2017 | | |
| CN | 107437047 A | 12/2017 | | |
| CN | 107480579 A | 12/2017 | | |
| CN | 107728240 A | 2/2018 | | |
| CN | 107799541 A | 3/2018 | | |
| CN | 107910344 A | 4/2018 | | |
| CN | 207586941 U | 7/2018 | | |
| CN | 207650835 U | 7/2018 | | |
| CN | 108615746 A | 10/2018 | | |
| CN | 108881750 A | 11/2018 | | |
| CN | 109074474 A | 12/2018 | | |
| CN | 109270988 A | 1/2019 | | |
| CN | 109472236 A | 3/2019 | | |
| CN | 109496308 A | 3/2019 | | |
| CN | 109564627 A | 4/2019 | | |
| CN | 109716353 A | 5/2019 | | |
| CN | 109791612 A | 5/2019 | | |
| CN | 208848221 U | 5/2019 | | |
| CN | 109844766 A | 6/2019 | | |
| CN | 109858465 A | 6/2019 | | |
| CN | 109863506 A | 6/2019 | | |
| CN | 109983471 A | 7/2019 | | |
| CN | 109993051 A | 7/2019 | | |
| CN | 110023956 A | 7/2019 | | |
| CN | 110036397 A | 7/2019 | | |
| CN | 110062931 A | 7/2019 | | |
| CN | 209168144 U | 7/2019 | | |
| CN | 110088768 A | 8/2019 | | |
| CN | 110096928 A | 8/2019 | | |
| CN | 110945525 A | 3/2020 | | |
| CN | 107004130 B | 8/2020 | | |
| CN | 211375615 U | 8/2020 | | |
| CN | 211375616 U | 8/2020 | | |
| CN | 211375617 U | 8/2020 | | |
| EP | 3115932 A1 * | 1/2017 | ......... | G06K 9/00013 |
| EP | 3514727 A2 | 7/2019 | | |
| KR | 20190036194 A | 4/2019 | | |
| KR | 20190069126 A | 6/2019 | | |
| WO | 2016064223 A1 | 4/2016 | | |
| WO | 2018020846 A1 | 2/2018 | | |

OTHER PUBLICATIONS

Wang, Y., "Research of Fingerprint Identification Based on Alignment-free Fingerprint Feature", China Master's Theses Full-text Database—Information Science and Technology, Mar. 15, 2017, vol. 2017, Issue 03.

Zhang, Y., "The study on fingerprint imaging of mobile phone based on the self-focusing lens array", China Master's Theses Full-text Database—Information Science and Technology, Jan. 15, 2019, vol. 2018, Issue 01.

Jang, K. et al., "Ultrathin Contact-Imaging Camera for Fingerprint Imaging Using Microlens Array and Multiple Block Layers", 2018 International Conference on Optical MEMS and Nanophotonics (OMN), Sep. 6, 2018, pp. 1-2.

Wang, Y. et al., "Design of embedded fingerprint identification system based on DSP", 2011 IEEE International Conference on Anti-Counterfeiting, Security and Identification, Jul. 29, 2011, pp. 47-50.

* cited by examiner

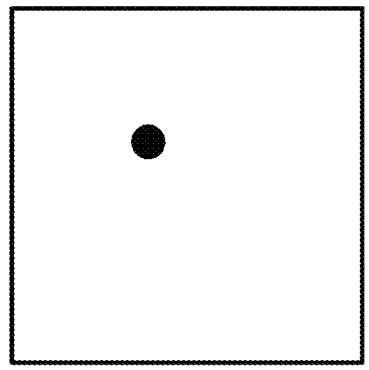
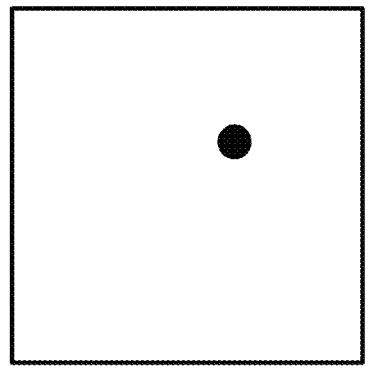
FIG. 12b　　　　　　　FIG. 12c
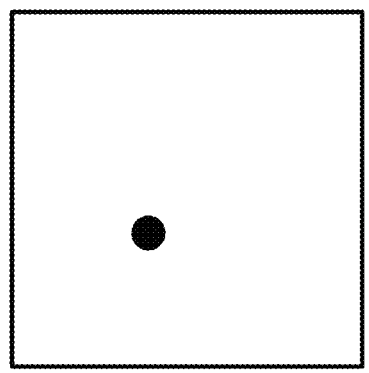
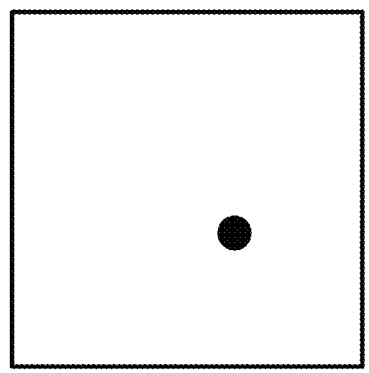
FIG. 12d　　　　　　　FIG. 12e
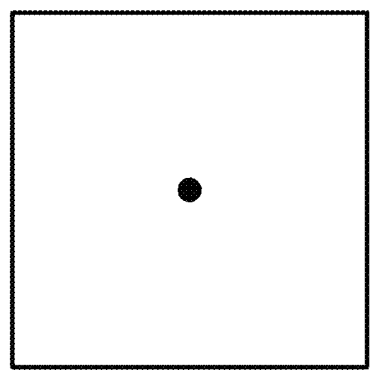
FIG. 12f

FINGERPRINT DETECTION APPARATUS AND METHOD AND ELECTRONIC DEVICE

CROSS-REFERENCE TO RELATED APPLICATIONS

This application is a continuation of International Application No. PCT/CN2019/102366, filed on Aug. 23, 2019, the disclosure of which is hereby incorporated by reference in its entirety.

TECHNICAL FIELD

The present application relates to the technical field of optical fingerprints, and more particularly, to a fingerprint detection apparatus and method and an electronic device.

BACKGROUND

At present, an under-screen optical fingerprint detection apparatus is usually installed on a middle frame under a display screen of a mobile phone. In a mass production process, an optical fingerprint detection apparatus usually calibrates the entire fingerprint detection system according to an installation distance of the current mass production. However, when the mobile phone is used by a user, the middle frame may be bent or displaced when encountering a strong impact, which causes the installation distance between the optical fingerprint detection apparatus and the display screen to change, resulting in that the detection and identification effect of fingerprint detection deteriorates.

In addition, in the mass production process, the optical fingerprint detection apparatus is installed on the middle frame of the mobile phone, which will inevitably cause a large tolerance problem, and also cause fluctuations in the installation distance between the optical fingerprint detection apparatus and the display screen, resulting in that the detection and identification effect of fingerprint detection deteriorates.

Therefore, how to improve the detection and identification effect of fingerprint detection when the distance between the optical fingerprint detection apparatus and the display screen changes, so as to improve the experience that affects users, is an urgent problem to be solved.

SUMMARY

Embodiments of the present application provide a fingerprint detection apparatus and method and an electronic device, which can improve the detection and identification effect of fingerprint detection when a distance between the optical fingerprint detection apparatus and a display screen changes, thereby improving user experience.

In a first aspect, provided is a fingerprint detection apparatus configured to be disposed below a display screen of an electronic device, including:

a pixel array including a plurality of groups of pixels, the plurality of groups of pixels being configured to respectively receive light signals in multiple directions to obtain multiple images, where the light signals in the multiple directions are light signals in multiple specific directions reflected or scattered by a finger above the display screen, and directed by light paths of an optical component; and a processing unit configured to move the multiple images for combination to form a reconstructed image, and adjust moving distances of the multiple images according to a quality parameter of the reconstructed image to form a target reconstructed image, the target reconstructed image being a fingerprint image of the finger for fingerprint identification.

In the technical solution of the present application, multiple images are obtained by receiving light signals in multiple directions, and moving the multiple images for combination to obtain a reconstructed image. Under different installation distances between the fingerprint detection apparatus and the display screen, a quality parameter of the reconstructed image changes. In the present application, the moving distances of multiple images are adjusted according to the quality parameter of the reconstructed image to obtain a target reconstructed image. The target reconstructed image can meet certain quality parameter requirements and adapt to different installation distances between the fingerprint detection apparatus and the display screen, which can improve the detection and identification effect of fingerprint detection, thereby improving user experience.

In a possible implementation manner, the fingerprint detection apparatus further includes:

the optical component configured to receive light signals reflected or scattered by the finger, form the light signals in the multiple directions, and transmit the light signals in the multiple directions to the pixel array.

In a possible implementation manner, the optical component includes:

at least one light shielding layer disposed above the pixel array, and configured to form light directing channels in multiple directions to transmit the light signals in the multiple directions to the pixel array; and a micro lens array disposed above the at least one light shielding layer, and configured to converge and transmit the light signals in the multiple directions to the light directing channels in the multiple directions.

In a possible implementation manner, the micro lens array is disposed below the display screen and includes a plurality of micro lenses; and the at least one light shielding layer is provided with the light directing channels in the multiple directions corresponding to each micro lens of the plurality of micro lenses, and bottoms of the light directing channels in the multiple directions corresponding to the each micro lens respectively extend below a plurality of adjacent micro lenses, where a pixel in the pixel array is provided below each light directing channel of the light directing channels in the multiple directions corresponding to the each micro lens; a plurality of pixels are provided below the each micro lens; and the plurality of pixels are respectively configured to receive the light signals in the multiple directions that are converged through a plurality of adjacent micro lenses and transmitted through the corresponding light directing channels.

In a possible implementation manner, the micro lens array is disposed below the display screen and includes a plurality of micro lenses; and the at least one light shielding layer is provided with the light directing channels in the multiple directions corresponding to each micro lens of the plurality of micro lenses, and bottoms of the light directing channels in the multiple directions corresponding to the each micro lens are located below a current micro lens, where a pixel in the pixel array is provided below each light directing channel of the light directing channels in the multiple directions corresponding to the each micro lens; a plurality of pixels are provided below the each micro lens; and the plurality of pixels are respectively configured to receive the light signals in the multiple directions that are converged through a current micro lens and transmitted through the corresponding light directing channels.

In a possible implementation manner, one group of pixels in the plurality of groups of pixels are used to receive light signals in one of the multiple directions to obtain one of the multiple images.

In a possible implementation manner, the number of pixels in each group of pixels in the plurality of groups of pixels is equal.

In a possible implementation manner, the plurality of groups of pixels include a first group of pixels, and a plurality of first pixels in the first group of pixels are not adjacent to each other, and the plurality of first pixels in the first group of pixels are adjacent to other pixels in the plurality of groups of pixels other than the first group of pixels.

In a possible implementation manner, each group of pixels in the plurality of groups of pixels are arranged in the same manner in the plurality of groups of pixels.

In a possible implementation manner, the plurality of groups of pixels are four groups of pixels, the light signals in the multiple directions are light signals in four directions, and the multiple images are four images.

In a possible implementation manner, the processing unit is configured to:

move an image in the multiple images by a distance of N image pixel points in an X direction and/or a Y direction in a two-dimensional plane for combination to form the reconstructed image, where N is a positive integer.

In a possible implementation manner, a moving distance of the image is a distance of N image pixel points, and the processing unit is configured to:

adjust the N according to the quality parameter of the reconstructed image to form the target reconstructed image.

In a possible implementation manner, the processing unit is configured to:

move the multiple images by the distance of N image pixel points in the X direction and/or the Y direction in the two-dimensional plane to obtain an overlapping image region, and sequentially intersect image pixel points of the multiple images located in the overlapping image region as pixel points of the reconstructed image to form the reconstructed image.

In a possible implementation manner, the number of pixel points of the reconstructed image is the sum of the number of pixel points of the multiple images.

In a possible implementation manner, relative positional relationships of multiple image pixel points of each image in the multiple images in the reconstructed image are the same as those in the each image.

In a possible implementation manner, the quality parameter of the reconstructed image includes: contrast, sharpness, signal-to-noise ratio, or similarity.

In a possible implementation manner, the target reconstructed image is a reconstructed image whose quality parameter is greater than or equal to a first quality threshold.

In a possible implementation manner, the target reconstructed image is a reconstructed image with the greatest quality parameter.

In a possible implementation manner, the processing unit is configured to:

move the multiple images for combination to form a first reconstructed image, and adjust the moving distances of the multiple images multiple times according to a quality parameter of the first reconstructed image to form multiple second reconstructed images, and compare quality parameters of the multiple second reconstructed images to obtain the target reconstructed image with the greatest quality parameter.

In a possible implementation manner, the light signals in the multiple directions are light signals from multiple first detection regions, and the multiple images are images of the multiple first detection regions, where the multiple first detection regions are provided on a surface of the display screen, and the multiple first detection regions include a first overlapping detection region.

In a possible implementation manner, a dot pattern, a light and dark stripe pattern, or a human finger is provided on the first overlapping detection region.

In a possible implementation manner, the target reconstructed image is a clear image of the first overlapping detection region.

In a possible implementation manner, the fingerprint detection apparatus further includes:

a storage unit configured to store at least one reference reconstructed image whose quality parameter is less than or equal to a second quality threshold; and the processing unit further configured to compare quality parameters of the reconstructed image and the reference reconstructed image, and if the quality parameter of the reconstructed image is less than or equal to the quality parameter of the reference reconstructed image, adjust the moving distances of the multiple images to form the target reconstructed image.

In a possible implementation manner, when the target reconstructed image is formed, the moving distances of the multiple images are target moving distances; and the storage unit is further configured to store the target moving distances of the multiple images.

In a possible implementation manner, the processing unit is further configured to: receive a first message sent by an accelerometer of the electronic device when a vertical distance between the fingerprint detection apparatus and the display screen changes, and in response to the first message, adjust the moving distances of the multiple images according to the quality parameter of the reconstructed image to form the target reconstructed image.

In a possible implementation manner, the light signals in the multiple directions are light signals from multiple second detection regions, and the multiple images are images of the multiple second detection regions, where the multiple second detection regions are provided on a light-emitting layer inside the display screen, and the multiple second detection regions include a second overlapping detection region; and a dot pattern or a light and dark stripe pattern is provided on the second overlapping detection region.

In a possible implementation manner, the fingerprint detection apparatus further includes:

a storage unit configured to store target moving distances of the multiple images, where a target moving distance is the sum of a first target moving distance and a second target moving distance;

the first target moving distance is a moving distance of an image in the multiple images when the target reconstructed image is formed; and the second target moving distance is a moving distance calculated according to a vertical distance between the surface of the display screen and the light-emitting layer of the display screen.

In a possible implementation manner, the multiple groups of pixels are configured to: respectively receive the light signals in the multiple directions to obtain multiple original images; and the processing unit is further configured to: perform at least one up-sampling on the multiple original images to form the multiple images.

In a second aspect, provided is a fingerprint detection method, applied to a fingerprint detection apparatus disposed below a display screen, including:

receiving light signals in multiple directions to obtain multiple images, where the light signals in the multiple directions are light signals in multiple specific directions reflected or scattered by a finger above the display screen, and directed by light paths of an optical component; and moving the multiple images for combination to form a reconstructed image, and adjusting moving distances according to a quality parameter of the reconstructed image to form a target reconstructed image, the target reconstructed image being a fingerprint image of the finger for fingerprint identification.

In a possible implementation manner, the fingerprint detection apparatus includes a pixel array including a plurality of groups of pixels; the multiple images are images obtained by the plurality of groups of pixels in the pixel array respectively receiving the light signals in the multiple directions; and one of the multiple images is an image obtained by one group of pixels in the plurality of groups of pixels receiving light signals in one of the multiple directions.

In a possible implementation manner, the fingerprint detection method further includes: receiving light signals reflected or scattered by the finger above the display screen; and directing the light signals reflected or scattered by the finger above the display screen to form the light signals in the multiple directions.

In a possible implementation manner, the directing the light signals reflected or scattered by the finger above the display screen to form the light signals in the multiple directions includes:

converging and transmitting the light signals reflected or scattered by the finger to light directing channels in multiple specific directions to form the light signals in the multiple directions.

In a possible implementation manner, the number of pixels in each group of pixels in the plurality of groups of pixels is equal.

In a possible implementation manner, the plurality of groups of pixels include a first group of pixels, and a plurality of first pixels in the first group of pixels are not adjacent to each other, and the plurality of first pixels in the first group of pixels are adjacent to other pixels in the plurality of groups of pixels other than the first group of pixels.

In a possible implementation manner, each group of pixels in the plurality of groups of pixels are arranged in the same manner in the plurality of groups of pixels.

In a possible implementation manner, the plurality of groups of pixels are four groups of pixels, the light signals in the multiple directions are light signals in four directions, and the multiple images are four images.

In a possible implementation manner, the moving the multiple images for combination to form the reconstructed image includes:

moving an image in the multiple images by a distance of N image pixel points in an X direction and/or a Y direction in a two-dimensional plane for combination to form the reconstructed image, where N is a positive integer.

In a possible implementation manner, a moving distance of the image is a distance of N image pixel points, and the adjusting the moving distance according to the quality parameter of the reconstructed image to form the target reconstructed image includes:

adjusting the N according to the quality parameter of the reconstructed image to form the target reconstructed image.

In a possible implementation manner, the moving the multiple images for combination to form the reconstructed image includes:

moving the multiple images by the distance of N image pixel points in the X direction and/or the Y direction in the two-dimensional plane to obtain an overlapping image region, and sequentially intersecting image pixel points of the multiple images located in the overlapping image region as pixel points of the reconstructed image to form the reconstructed image.

In a possible implementation manner, the number of pixel points of the reconstructed image is the sum of the number of pixel points of the multiple images.

In a possible implementation manner, relative positional relationships of multiple image pixel points of each image in the multiple images in the reconstructed image are the same as those in the each image.

In a possible implementation manner, the quality parameter of the reconstructed image includes: contrast, sharpness, signal-to-noise ratio, or similarity.

In a possible implementation manner, the target reconstructed image is a reconstructed image whose quality parameter is greater than or equal to a first quality threshold.

In a possible implementation manner, the target reconstructed image is a reconstructed image with the greatest quality parameter.

In a possible implementation manner, the fingerprint detection method further includes:

moving the multiple images for combination to form a first reconstructed image, and adjusting the moving distances of the multiple images multiple times according to a quality parameter of the first reconstructed image to form multiple second reconstructed images, and comparing quality parameters of the multiple second reconstructed images to obtain the target reconstructed image with the greatest quality parameter.

In a possible implementation manner, the light signals in the multiple directions are light signals from multiple first detection regions, and the multiple images are images of the multiple first detection regions, where the multiple first detection regions are provided on a surface of the display screen, and the multiple first detection regions include a first overlapping detection region.

In a possible implementation manner, a dot pattern, a light and dark stripe pattern, or a human finger is provided on the first overlapping detection region.

In a possible implementation manner, the formed target reconstructed image is a clear image of the first overlapping detection region.

In a possible implementation manner, the fingerprint detection method further includes:

storing at least one reference reconstructed image whose quality parameter is less than or equal to a second quality threshold; and comparing quality parameters of the reconstructed image and the reference reconstructed image, and if the quality parameter of the reconstructed image is less than or equal to the quality parameter of the reference reconstructed image, adjusting the moving distances of the multiple images to form the target reconstructed image.

In a possible implementation manner, when the target reconstructed image is formed, the fingerprint detection method further includes:

storing the moving distances of the multiple images.

In a possible implementation manner, the fingerprint detection method further includes:

receiving a first message sent by an accelerometer of the electronic device when a vertical distance between the fingerprint detection apparatus and the display screen changes; and in response to the first message, adjusting the moving distances of the multiple images according to the quality parameter of the reconstructed image to form the target reconstructed image.

In a possible implementation manner, the light signals in the multiple directions are light signals from multiple second detection regions, and the multiple images are images of the multiple second detection regions, where the multiple second detection regions are provided on a light-emitting layer inside the display screen, and the multiple second detection regions include a second overlapping detection region; and a dot pattern or a light and dark stripe pattern is provided on the second overlapping detection region.

In a possible implementation manner, the fingerprint detection method further includes:

storing target moving distances of the multiple images, where a target moving distance is the sum of a first target moving distance and a second target moving distance;

the first target moving distance is a moving distance of an image in the multiple images when the target reconstructed image is formed; and the second target moving distance is a moving distance calculated according to a vertical distance between the surface of the display screen and the light-emitting layer of the display screen.

In a possible implementation manner, the receiving the light signals in the multiple directions to obtain the multiple images includes:

receiving the light signals in the multiple directions to form multiple original images; and performing at least one up-sampling on the multiple original images to form the multiple images.

In a third aspect, provided is a chip, including an input and output interface, at least one processor, at least one memory and a bus, where the at least one memory is configured to store instructions, and the at least one processor is configured to call the instructions in the at least one memory to execute the method in the second aspect or any possible implementation manner of the second aspect.

In a fourth aspect, provided is an electronic device including a display screen and the fingerprint detection apparatus in the first aspect or any possible implementation manner of the first aspect.

And the fingerprint detection apparatus is disposed below the display screen.

In a fifth aspect, provided is a computer readable medium configured to store a computer program, where the computer program includes an instruction used to execute the method in the second aspect or any possible implementation manner of the second aspect.

In a sixth aspect, provided is a computer program product including an instruction that when a computer runs the instruction of the computer program product, the computer executes the fingerprint detection method in the second aspect or any possible implementation manner of the second aspect.

Specifically, the computer program product may be run on the electronic device of the fourth aspect.

BRIEF DESCRIPTION OF THE DRAWINGS

FIGS. 10a to 10c are schematic diagrams of a detection region according to an embodiment of the present application.

FIGS. 11a to 11f are schematic pixel diagrams of multiple images and a reconstructed image according to an embodiment of the present application.

FIGS. 12a to 12f are schematic diagrams of multiple images according to an embodiment of the present application.

DESCRIPTION OF EMBODIMENTS

Technical solutions in embodiments of the present application will be described hereinafter with reference to accompanying drawings.

It should be understood that embodiments of the present application may be applied to an optical fingerprint system, including but not limited to an optical fingerprint identification system and a product based on optical fingerprint imaging. The embodiments of the present application are only described by taking the optical fingerprint system as an example, which should not constitute any limitation to the embodiments of the present application, and the embodiments of the present application are also applicable to other systems using an optical imaging technology or the like.

As a common application scenario, an optical fingerprint system provided in an embodiment of the present application may be applied to a smart phone, a tablet computer, and other mobile terminals having a display screen or other electronic devices. More specifically, in the foregoing electronic device, a fingerprint identification apparatus may be specifically an optical fingerprint apparatus, which may be disposed in a partial region or an entire region under a display screen, thereby forming an under-display optical fingerprint system. Alternatively, the fingerprint identification apparatus may be partially or entirely integrated into the interior of the display screen of the electronic device to form an in-display optical fingerprint system.

Figure 1:
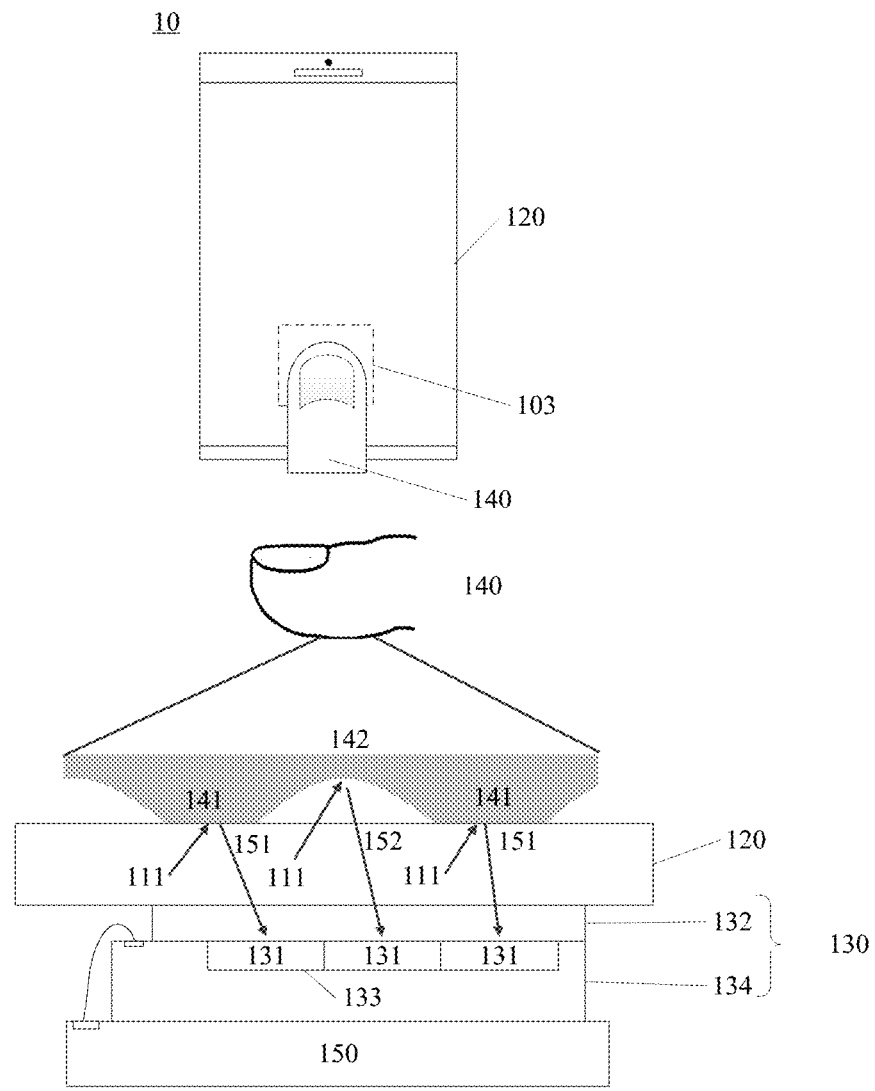
FIG. 1 is a schematic structural diagram of an electronic device to which an embodiment of the present application is applicable.

FIG. 1 is a schematic structural diagram of an electronic device to which an embodiment of the present application can be applicable. An electronic device 10 includes a display screen 120 and an optical fingerprint apparatus 130, where the optical fingerprint apparatus 130 is disposed in a partial region under the display screen 120. The optical fingerprint apparatus 130 includes an optical fingerprint sensor including a sensing array 133 having a plurality of optical sensing units 131, and a region where the sensing array 133 is located or a sensing region of the sensing array 133 is a fingerprint detection region 103 of the optical fingerprint apparatus 130. As shown in FIG. 1, the fingerprint detection region 103 is located within a display region of the display screen 120. In an alternative embodiment, the optical fingerprint apparatus 130 may also be disposed at other positions, such as a side of the display screen 120 or a non-light transmissive region at an edge of the electronic device 10, and a light signal of at least part of the display region of the display screen 120 is directed to the optical fingerprint apparatus 130 through a light path design, such that the fingerprint detection region 103 is actually located in the display region of the display screen 120.

It should be understood that an area of the fingerprint detection region 103 may be different from an area of the sensing array of the optical fingerprint apparatus 130. For example, the area of the fingerprint detection region 103 of the optical fingerprint apparatus 130 may be larger than the area of the sensing array of the optical fingerprint apparatus 130 through a lens imaging light path design, a reflective folding light path design or other light path designs such as light convergence or reflection for example. In other alternative implementation manners, if the light path is directed in a manner of light collimation for example, the area of the fingerprint detection region 103 of the optical fingerprint apparatus 130 may also be designed to be substantially identical with the area of the sensing array of the optical fingerprint apparatus 130.

Therefore, when a user needs to unlock the electronic device or perform other fingerprint verification, a fingerprint input may be implemented merely by pressing a finger on the fingerprint detection region 103 located on the display screen 120. Since fingerprint detection may be implemented in the screen, there is no need to exclusively reserve space for a front surface of the electronic device 10 adopting the foregoing structure to set a fingerprint button (such as a Home button), so that a full screen solution may be adopted; that is, the display region of the display screen 120 may be substantially extended to an entire front surface of the electronic device 10.

As an optional implementation manner, as shown in FIG. 1, the optical fingerprint apparatus 130 includes a light detecting portion 134 and an optical component 132. The light detecting portion 134 includes the sensing array, and a readout circuit and other auxiliary circuits electrically connected to the sensing array, which is fabricated in a die by a semiconductor process such as an optical imaging chip or an optical fingerprint sensor; the sensing array is specifically a photo detector array including a plurality of photo detectors distributed in an array, and the photo detectors may be used as the optical sensing units as described above. The optical component 132 may be disposed above the sensing array of the light detecting portion 134, and may specifically include a filter layer, a light directing layer or a light path directing structure, and other optical elements, the filter layer may be used to filter ambient light passing through a finger, and the light directing layer or light path directing structure is mainly used to direct reflected light reflected from a finger surface to the sensing array for optical detection.

In a specific implementation, the optical component 132 and the light detecting portion 134 may be encapsulated in the same optical fingerprint unit. For example, the optical component 132 and the light detecting portion 134 may be encapsulated in the same optical fingerprint chip, or the optical component 132 may be disposed outside a chip where the light detecting portion 134 is located, for example, the optical component 132 is attached above the chip, or a part of elements of the optical component 132 are integrated into the chip.

There are various implementations for the light directing layer or light path directing structure of the optical component 132, for example, the light directing layer may be specifically a collimator layer fabricated on a semiconductor silicon wafer, which has a plurality of collimating units or micro-pore arrays, and the collimating unit may be specifically a hole. Light in the reflected light reflected from the finger that is vertically incident to the collimating unit may pass through the collimating unit and be received by the optical sensing unit below it. However, light with an excessive large incident angle is attenuated through multiple reflection inside the collimating unit, therefore, each optical sensing unit may basically only receive the reflected light reflected from a fingerprint pattern right above the optical sensing unit, and thus the sensing array may detect a fingerprint image of the finger.

In another embodiment, the light directing layer or the light path directing structure may also be an optical lens layer having one or more lens units, for example, a lens group composed of one or more aspheric lenses, for converging reflected light reflected from the finger to the sensing array of the light detecting portion 134 below it, so that the sensing array may perform imaging based on the reflected light so as to obtain the fingerprint image of the finger. Optionally, the optical lens layer may be provided with a pinhole in the light path of the lens unit, and the pinhole may cooperate with the optical lens layer to expand the field of view of the optical fingerprint apparatus, to improve a fingerprint imaging effect of the optical fingerprint apparatus 130.

In other embodiments, the light directing layer or the light path directing structure may also specifically adopt a micro-lens layer having a micro-lens array constituted by a plurality of micro-lenses, which may be formed above the sensing array of the light detecting portion 134 by a semiconductor growth process or other processes, and each micro-lens may correspond to one of the sensing units in the sensing array respectively. Furthermore, other optical film layers, such as a dielectric layer or a passivation layer, may be formed between the micro-lens layer and the sensing unit, and more specifically, a light shielding layer having a micro-pore may also be formed between the micro-lens layer and the sensing unit, where the micro-pore is formed between the corresponding micro-lens and the sensing unit, and the light shielding layer may shield optical interference between adjacent micro-lens and sensing unit, such that light corresponding to the sensing unit is converged to the interior of the micro-pore through the micro-lens and transmitted to the sensing unit via the micro-pore for optical fingerprint imaging. It should be understood that several implementations of the forgoing light path directing structure may be used alone or in combination, for example, a micro-lens layer may be further disposed under the collimator layer or the optical lens layer. Of course, when the collimator layer or the optical lens layer is used in combination with the micro-lens layer, the specific stacked structure or light path may require to be adjusted according to actual needs.

As an optional embodiment, the display screen 120 may adopt a display screen with a self-emitting display unit, for example, an organic light-emitting diode (OLED) display screen or a micro light-emitting diode (Micro-LED) display screen. By taking an OLED display screen as an example, the optical fingerprint apparatus 130 may use a display unit (that is, an OLED light source) of the OLED display screen 120 that is located in the fingerprint detection region 103 as an excitation light source for optical fingerprint detection. When a finger 140 is pressed against the fingerprint detection region 103, the display screen 120 emits a beam of light 111 to a target finger 140 above the fingerprint detection region 103, and the light 111 is reflected by a surface of the finger 140 to form reflected light or form scattered light after scattering inside the finger 140. In related patent applications, the reflected light and the scattered light are collectively referred to as reflected light for convenience of description. Since a ridge and a valley of a fingerprint have different light reflecting capabilities, reflected light 151 from the ridge of the fingerprint and the reflected light 152 from the valley of the fingerprint have different light intensities. After passing through the optical component 132, the reflected light is received by the sensing array 134 in the optical fingerprint apparatus 130 and converted into corresponding electrical signal, that is, a fingerprint detection signal; and fingerprint image data may be obtained based on the fingerprint detection signal, and fingerprint matching verification may be further performed, thereby implementing an optical fingerprint identification function at the electronic device 10.

In other embodiments, the optical fingerprint apparatus 130 may also use an internal light source or an external light source to provide a light signal for fingerprint detection. In this case, the optical fingerprint apparatus 130 may be applied to a non-self-emitting display screen, such as a liquid crystal display screen or other passive light-emitting display screens. By taking a liquid crystal display screen having a backlight module and a liquid crystal panel as an example, in order to support under-screen fingerprint detection of the liquid crystal display screen, the optical fingerprint system of the electronic device 10 may further include an excitation light source for optical fingerprint detection. The excitation light source may specifically be an infrared light source or a light source of non-visible light with a specific wavelength, which may be disposed under the backlight module of the liquid crystal display screen or disposed in an edge region under a protective cover of the electronic device 10. The optical fingerprint apparatus 130 may be disposed under the liquid crystal panel or the edge region of the protective cover, and light for fingerprint detection may reach the optical fingerprint apparatus 130 by being directed over a light path. Alternatively, the optical fingerprint apparatus 130 may also be disposed under the backlight module, and the backlight module allows the light for fingerprint detection to pass through the liquid crystal panel and the backlight module and reach the optical fingerprint apparatus 130 by providing a via hole on a film layer such as a diffusion sheet, a brightening sheet, a reflection sheet or the like, or by performing other optical designs. When the optical fingerprint apparatus 130 uses an internal light source or an external light source to provide a light signal for fingerprint detection, a detection principle is consistent with the foregoing description.

It should be understood that, in a specific implementation, the electronic device 10 further includes a transparent protective cover; the cover may be a glass cover or a sapphire cover, which is located above the display screen 120 and covers a front surface of the electronic device 10. Therefore, in an embodiment of the present application, the so-called the finger being pressed against the display screen 120 actually refers to the finger being pressed against the cover above the display screen 120 or a surface of the protective layer covering the cover.

It should also be understood that the electronic device 10 may further include a circuit board 150 that is disposed under the optical fingerprint apparatus 130. The optical fingerprint apparatus 130 may be bonded to the circuit board 150 by a back adhesive, and achieve electrical connection with the circuit board 150 by welding of a pad and a mental wire. The optical fingerprint apparatus 130 may achieve electrical interconnection and signal transmission with other peripheral circuits or other elements of the electronic device 10 through the circuit board 150. For example, the optical fingerprint apparatus 130 may receive a control signal of a processing unit of the electronic device 10 through the circuit board 150, and may also output a fingerprint detection signal from the optical fingerprint apparatus 130 to the processing unit, a control unit and the like of the electronic device 10 through the circuit board 150.

On the other hand, in some embodiments, the optical fingerprint apparatus 130 may only include one optical fingerprint sensor, and in this case, the fingerprint detection region 103 of the optical fingerprint apparatus 130 has a smaller area and a fixed position, and therefore, when an fingerprint input is performed, the user needs to press the finger at a specific position of the fingerprint detection region 103, otherwise the optical fingerprint apparatus 130 may not be able to capture the fingerprint image, thereby resulting in poor user experience. In other alternative embodiments, the optical fingerprint apparatus 130 may specifically include a plurality of optical fingerprint sensors which may be disposed under the display screen 120 side by side in a splicing manner, and sensing regions of the plurality of optical fingerprint sensors collectively constitute the fingerprint detection region 103 of the optical fingerprint apparatus 130. In other words, the fingerprint detection region 103 of the optical fingerprint apparatus 130 may include a plurality of sub-regions, each sub-region corresponding to a sensing region of one of the optical fingerprint sensors respectively, so that a fingerprint capturing region 103 of the optical fingerprint apparatus 130 may be extended to a main region of a lower portion of the display screen, that is, it is extended to a generally pressed region by the finger, thereby achieving a blind pressing type of a fingerprint input operation. Alternatively, when the number of the optical fingerprint sensors is sufficient, the fingerprint detection region 130 may also be extended to a half of the display region or even the entire display region, thereby achieving half-screen or full-screen fingerprint detection.

It should also be understood that in the embodiment of the present application, the sensing array in the optical fingerprint apparatus may also be referred to as a pixel array, and the optical sensing unit or sensing unit in the sensing array may also be referred to as a pixel unit.

It should be noted that the optical fingerprint apparatus in the embodiment of the present application may also be referred to as a fingerprint detection apparatus, an optical fingerprint detection apparatus, an optical fingerprint identification module, a fingerprint identification apparatus, a fingerprint identification module, a fingerprint module, a fingerprint capturing apparatus, or the like, and the foregoing terms may be replaced with each other.

Figure 2:
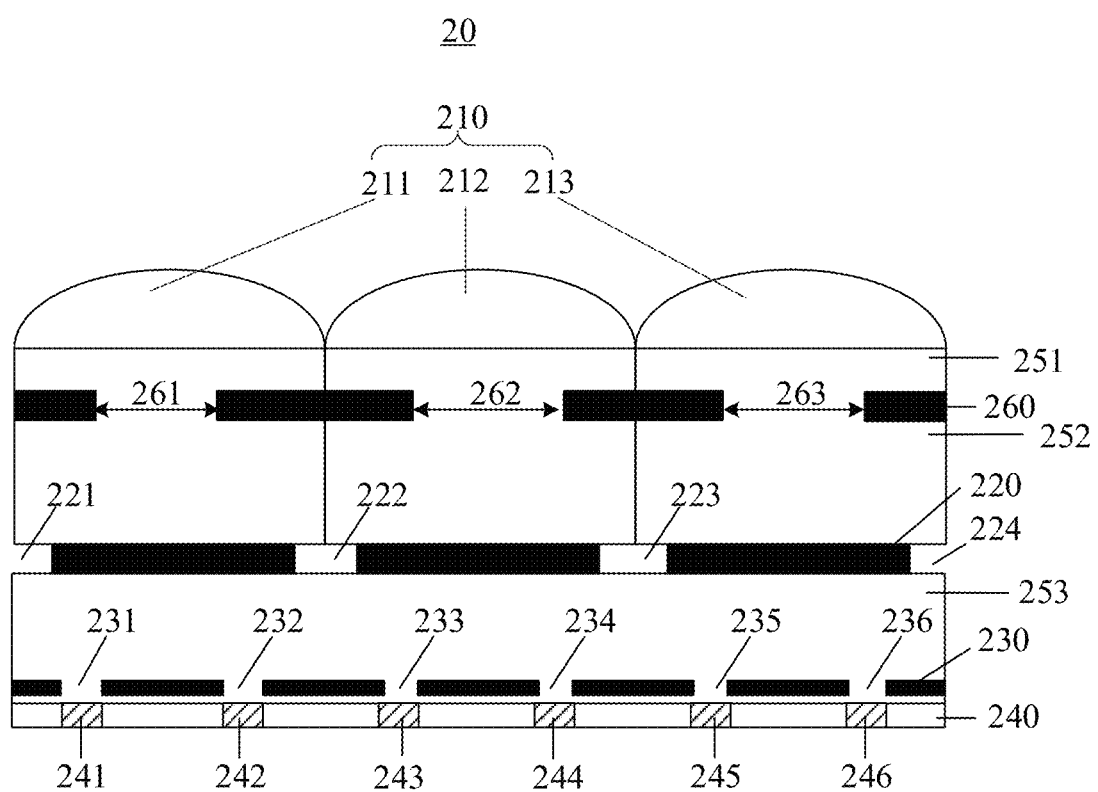
FIG. 2 is a schematic structural diagram of a fingerprint detection apparatus according to an embodiment of the present application.
Figure 3:
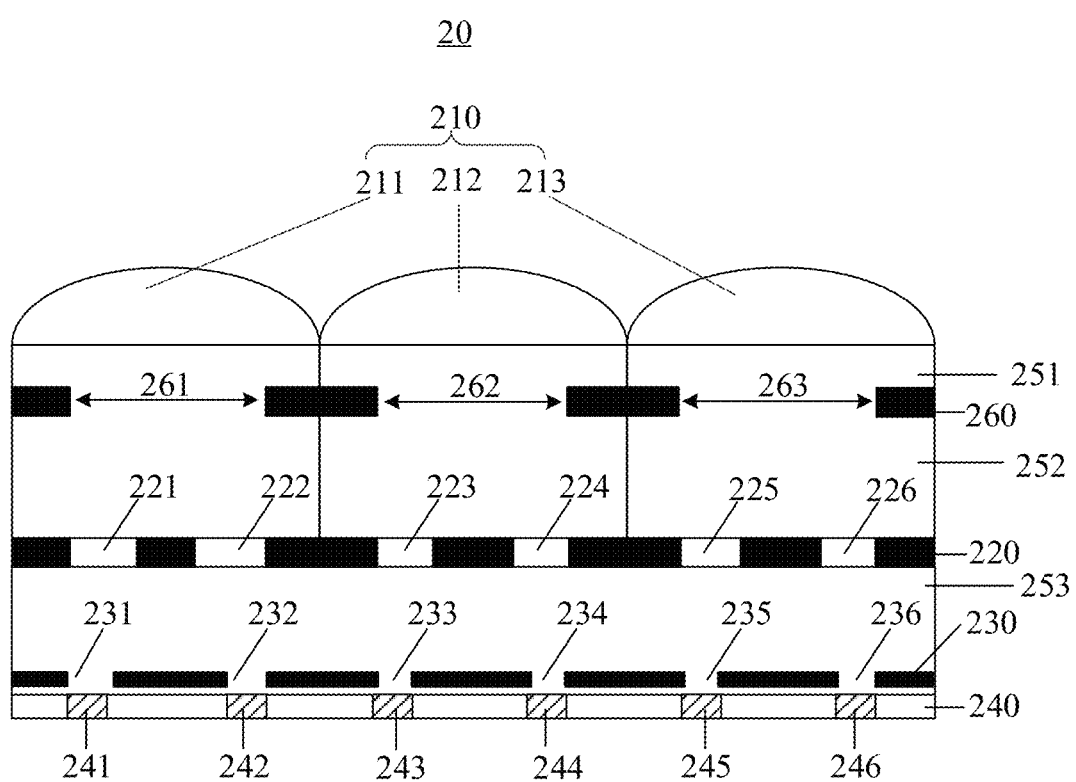
FIG. 3 is a schematic structural diagram of another fingerprint detection apparatus according to an embodiment of the present application.

FIGS. 2 and 3 are schematic structural diagrams of a fingerprint detection apparatus 20 according to embodiments of the present application.

Optionally, the fingerprint detection apparatus 20 may be applicable to the electronic device 10 shown in FIG. 1, or the fingerprint detection apparatus 20 may be the optical fingerprint apparatus 130 shown in FIG. 1.

As shown in FIGS. 2 and 3, the fingerprint detection apparatus 20 may include a micro lens array 210, at least one light shielding layer, and a pixel array 240. The micro lens array 210 may be configured to be disposed below a display screen of an electronic device, the at least one light shielding layer may be disposed below the micro lens array 210, and the pixel array 240 may be disposed below the at least light shielding layer. It should be noted that the micro lens array 210 and the at least one light shielding layer may be the light directing structure included in the optical component 132 shown in FIG. 1, and the pixel array 240 may be the sensing array 133 having the plurality of optical sensing units 131 (which may also be referred to as photosensitive pixels, pixel units, etc.) shown in FIG. 1, which is not repeatedly described here to avoid repetition.

Specifically, the micro lens array 210 includes a plurality of micro lenses. For example, the micro lens array 210 may include a first micro lens 211, a second micro lens 212, and a third micro lens 213. The at least one light shielding layer may include a plurality of light shielding layers. For example, the at least one light shielding layer may include a first light shielding layer 220, a second light shielding layer 230, and a third light shielding layer 260. The pixel array 240 may include a plurality of pixels. For example, the pixel array may include a first pixel 241, a second pixel 242, a third pixel 243, a fourth pixel 244, a fifth pixel 245, and a sixth pixel 246.

The at least one light shielding layer is provided with a plurality of light directing channels corresponding to each micro lens in the micro lens array 210. As shown in FIGS. 2 and 3, the first light shielding layer 220, the second light shielding layer 230, and the third light shielding layer 260 are respectively provided with at least one hole corresponding to each micro lens (for example, the first micro lens 211, the second micro lens 212, and the third micro lens 213) of the plurality of micro lenses. For example, the first light shielding layer 220 is provided with a hole 221 and a hole 222 corresponding to the first micro lens 211, the second light shielding layer 230 is provided with a hole 231 and a hole 232 corresponding to the first micro lens 211, and the third light shielding layer 260 is provided with a hole 261 corresponding to the first micro lens 211. Similarly, the first light shielding layer 220, the second light shielding layer 230, and the third light shielding layer 260 are also provided with holes corresponding to the second micro lens 212 and the third micro lens 213.

Optionally, as shown in FIG. 2, bottoms of the plurality of light directing channels corresponding to the each micro lens respectively extend below a plurality of adjacent micro lenses.

In an example of the second micro lens 212, a plurality of light directing channels corresponding to the second micro lens 212 may include a light directing channel formed by a hole 262, the hole 222 and the hole 232 and a light directing channel formed by the hole 262, a hole 223 and a hole 235. The light directing channel formed by the hole 262, the hole 222 and the hole 232 extends below the first micro lens 211, and the light directing channel formed by the hole 262, the hole 223 and the hole 235 extends below the third micro lens 213.

Optionally, as shown in FIG. 3, bottoms of the plurality of light directing channels corresponding to the each micro lens are located below the corresponding micro lens.

In an example of the second micro lens 212, a plurality of light directing channels corresponding to the second micro lens 212 may include a light directing channel formed by the hole 262, the hole 223 and a hole 233 and a light directing channel formed by the hole 262, a hole 224 and a hole 234, and the two light directing channels are both located below the second micro lens 212.

Further, a pixel may be provided below each light directing channel of the plurality of light directing channels corresponding to the each micro lens in the micro lens array 210. A plurality of pixels below each micro lens respectively receive tilt light signals in multiple directions directed by the corresponding light directing channels.

As shown in FIG. 2, in an example of the second micro lens 212, the second pixel 242 is provided below the light directing channel formed by the hole 262, the hole 222 and the hole 232, and the fifth pixel 245 is provided below the light directing channel formed by the hole 262, the hole 223 and the hole 235.

Furthermore, a plurality of pixels are provided below the each micro lens in the micro lens array 210. The plurality of pixels provided below the each micro lens may be respectively configured to receive the light signals that are converged through a plurality of adjacent micro lenses and transmitted through the corresponding light directing channels, and may also be configured to receive the light signals that are converged through a current micro lens and transmitted through the corresponding light directing channels. The light signals can be used to detect fingerprint information of a finger.

Optionally, as shown in FIGS. 2 and 3, an aperture of a hole in the third light shielding layer 260 is greater than an aperture of a hole in the first light shielding layer 220, and the aperture of the hole in the first light shielding layer 220 is greater than an aperture of a hole in the second light shielding layer 230.

It should be noted that the fingerprint detection apparatus 20 may also include only one light shielding layer. In this case, the plurality of light directing channels may be a plurality of tilt through holes in the one light shielding layer corresponding to the same micro lens. For example, a thickness of the one light shielding layer is greater than a preset threshold, so that the plurality of pixels provided below the each micro lens are respectively configured to receive the light signals that are converged through a micro lens and transmitted through the corresponding light directing channels.

As shown in FIGS. 2 and 3, the fingerprint detection apparatus 20 may further include a transparent medium layer.

The transparent medium layer may be disposed at at least one of the following positions: a position between the micro lens array 210 and the at least one light shielding layer; a position between the at least one light shielding layer; and a position between the at least one light shielding layer and the pixel array 240. For example, the transparent medium layer may include a first medium layer 251 located between the micro lens array 210 and the at least one light shielding layer (that is, the third light shielding layer 260), a second medium layer 252 between the first light shielding layer 220 and the third light shielding layer 260, and a third medium layer 253 between the second light shielding layer 230 and the first light shielding layer 220.

A material of the transparent medium layer is any transparent material that is transparent to light, such as glass, or may be transitioned by air or vacuum, which is not specifically limited in the present application.

Figure 4A:
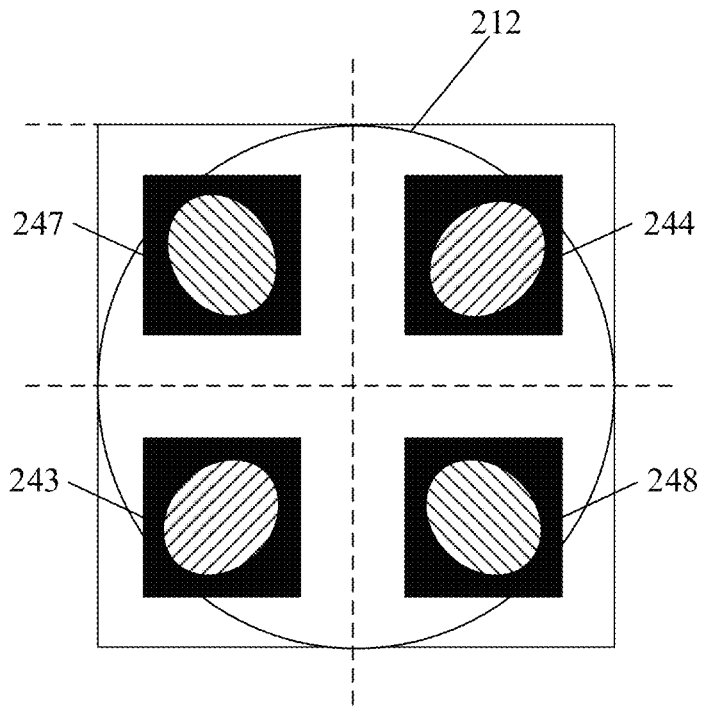
FIGS. 4a to 4b are schematic top views of a second micro lens shown in FIGS. 2 and 3.
Figure 4B:
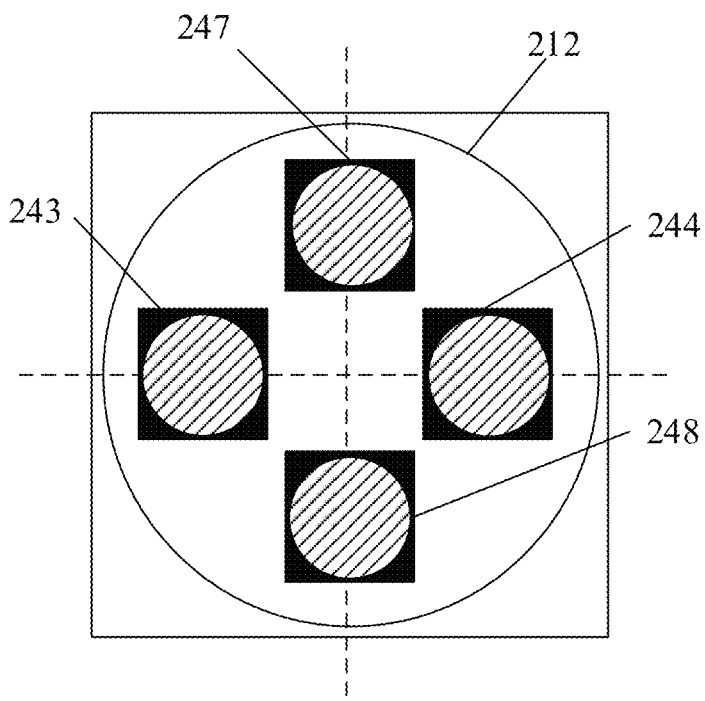

FIGS. 4a and 4b show schematic top views of the second micro lens 212 shown in FIGS. 2 and 3.

As shown in FIG. 4a, four pixels may be provided below the second micro lens 212, and the four pixels may be distributed as a rectangular or a square, that is, lines connecting centers of the four pixels constitutes a rectangular or a square.

It should be understood that pixels below each micro lens in the micro lens array 210 may be provided in the same manner as the pixels below the second micro lens 212, for example, four pixels are provided below each micro lens, and the four pixels are distributed in a rectangular shape.

It should also be understood that the four pixels below the second micro lens 212 may also be distributed in a rhombus, a circle or an ellipse. For example, as shown in FIG. 4b, the four pixels below the second micro lens 212 are distributed as a rhombus, that is, lines connecting centers of the four pixels constitutes a rhombus. As long as the four pixels can receive light signals converged by the second micro lens 212 or light signals converged by a micro lens adjacent to the second micro lens, the embodiment of the present application does not limit the distribution manner of the four pixels. Since micro lenses in the micro lens array can be distributed in an array, when a plurality of pixels below the each micro lens are in a rectangular distribution, the correspondence manner of the micro lens array and the pixel array can be effectively simplified, thereby simplifying the structural design of the fingerprint detection apparatus.

As shown in FIGS. 4a and 4b, the four pixels below the second micro lens 212 are the fourth pixel 244, the third pixel 243, a seventh pixel 247 and an eighth pixel 248, and the four pixels receive light signals in different directions through different light directing channels. For example, the fourth pixel 244 receives a light signal in a first direction, the third pixel 243 receives a light signal in a second direction, the seventh pixel 247 receives a light signal in a third direction, and the eighth pixel 248 receives a light signal in a fourth direction.

It should be understood that light signals received by the corresponding four pixels below each micro lens in the micro lens array 210 may be in the same direction as the light signals received by the four pixels below the second micro lens 212. For example, four pixels below the first micro lens 211 correspond to four light directing channels, and respectively receive light signals in the first direction, the second direction, the third direction, and the fourth direction through the four light directing channels.

Figure 4C:
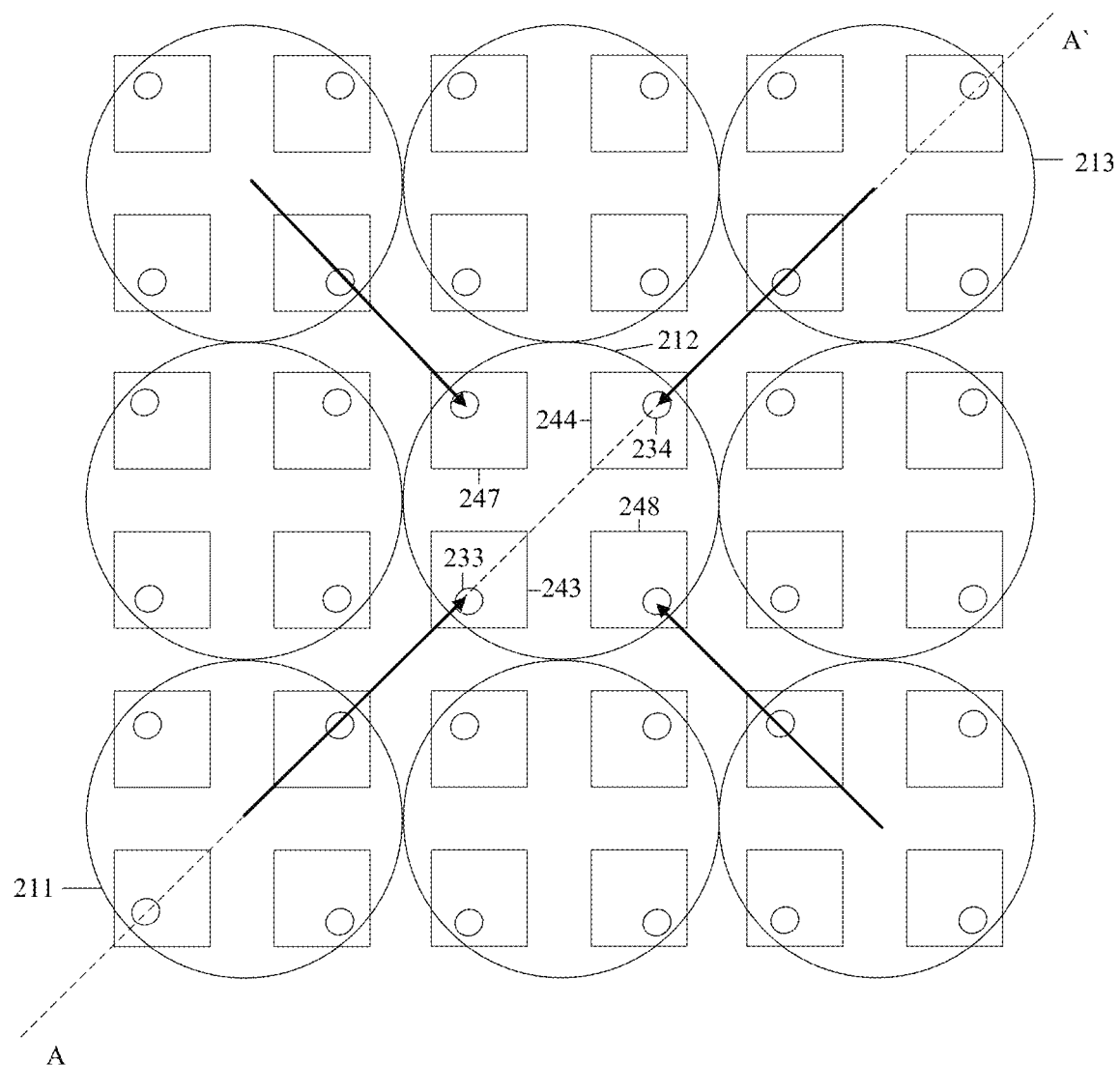
FIG. 4c is a schematic top view of the fingerprint detection apparatus shown in FIG. 2.

Optionally, FIG. 4c is a schematic top view of the fingerprint detection apparatus 20 corresponding to FIG. 2. FIG. 2 is a cross-sectional view along a line A-A' of FIG. 4c.

As shown in FIG. 4c, the first micro lens 211 and the third micro lens 213 are located at diagonally lower left and diagonally upper right sides of the second micro lens 212, respectively. A light signal converged by the first micro lens 211 passes through the corresponding light directing channel to form a light signal in a second direction, which is received by the third pixel 243 located below the second micro lens 212. A light signal converged by the third micro lens 213 passes through the corresponding light directing channel to form a light signal in a first direction, which is received by the fourth pixel 244 located below the second micro lens 212.

Figure 4D:
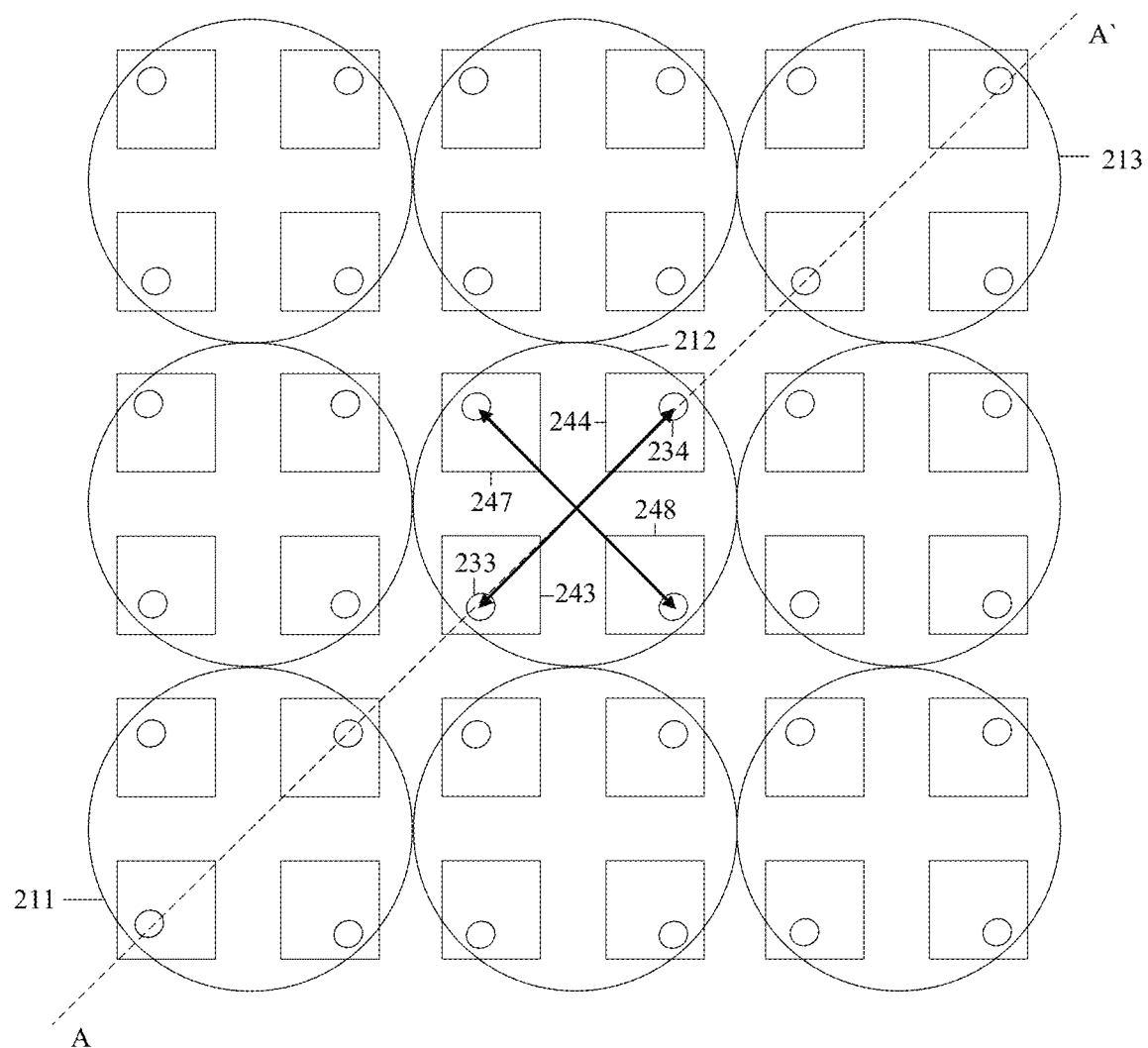
FIG. 4d is a schematic top view of the fingerprint detection apparatus shown in FIG. 3.

Optionally, FIG. 4d is a schematic top view of the fingerprint detection apparatus 20 corresponding to FIG. 3. FIG. 3 is a cross-sectional view along a line A-A' of FIG. 4d.

As shown in FIG. 4d, four pixels below the second micro lens 212 all receive light signals converged by the current second micro lens 212. The third pixel 243 and the fourth pixel 244 receive light signals in different directions, and directions of the light signals are opposite to each other in the top view.

Figure 5:
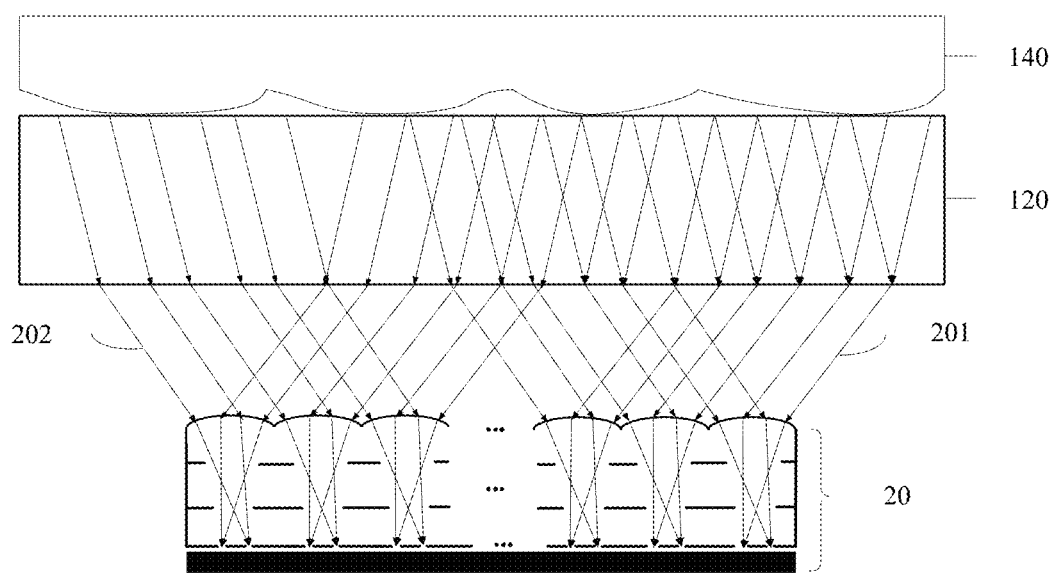
FIG. 5 is a schematic diagram of another fingerprint detection apparatus according to an embodiment of the present application.

FIG. 5 shows a schematic cross-sectional view of a fingerprint detection apparatus 20 disposed below a display screen 120, such as an OLED display screen, where the fingerprint detection apparatus 20 includes a micro lens array 210, at least one light shielding layer and a pixel array 240, and the pixel array 240 receives light signals 201 in a first direction and light signals 202 in a second direction. It should be understood that the fingerprint detection apparatus 20 also receives light signals in a third direction and a fourth direction at the same time, which is only not shown in the cross-sectional view of FIG. 5.

Figure 6A:
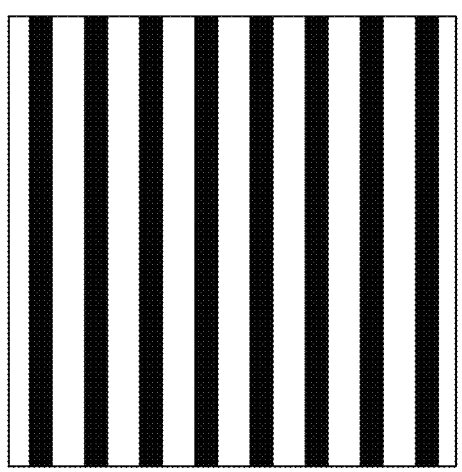
FIGS. 6a to 6g are schematic diagrams of multiple images according to an embodiment of the present application.
Figure 6B:
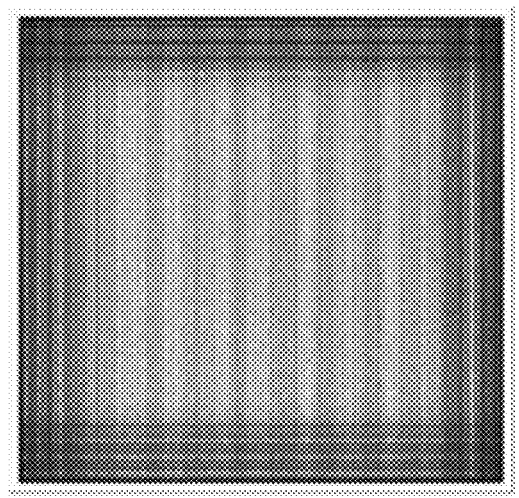

When the light signals received by the fingerprint detection apparatus 20 are light signals of a light and dark stripe pattern as shown in FIG. 6a, and four pixels corresponding to each micro lens in the fingerprint detection apparatus 20 receive light signals in four different directions, an original image obtained by the pixel array 240 is as shown in FIG. 6b. Since the pixel array receives light signals in multiple directions at the same time, and four pixels corresponding to a micro lens perform imaging on light signals of different imaging regions simultaneously, an image formed by the pixel array 240 is an image superimposed on different imaging regions, which is a blurry image.

Figure 6C:
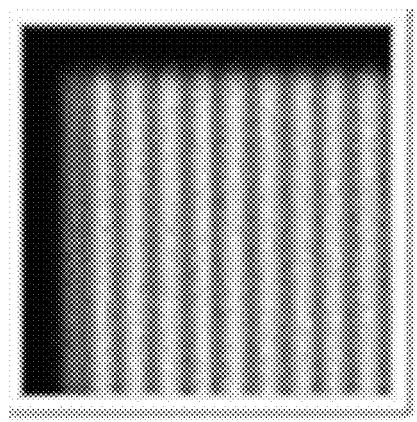
Figure 6D:
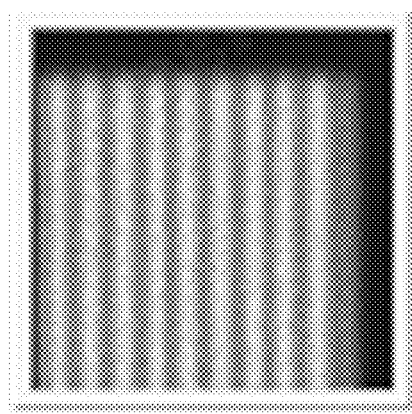
Figure 6E:
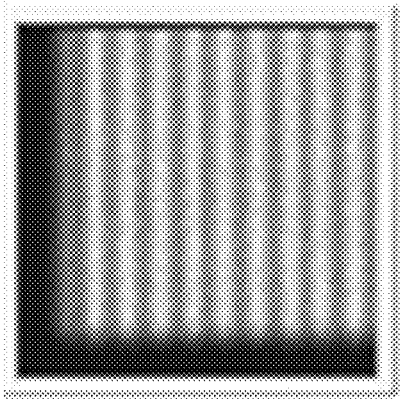
Figure 6F:
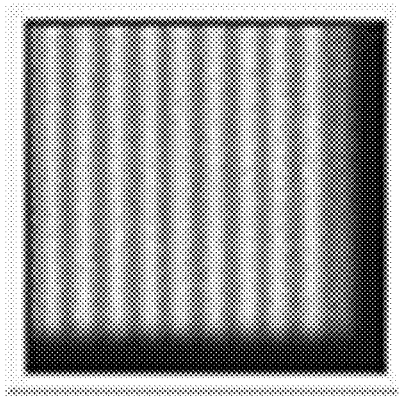

Specifically, one pixel corresponding to each micro lens in the micro lens array 210 receives a light signal 201 in the first direction, and an original image generated by a plurality of pixels in the pixel array 240 that receive the light signals 201 in the first direction is as shown in FIG. 6c. Since a plurality of pixels all receive light signals in the same direction, there is no situation where images of different imaging regions are superimposed. Therefore, a processing unit can process and obtain a first image shown in FIG. 6c corresponding to the light signals 201 in the first direction, which is a clear image. Similarly, as shown in FIGS. 6d to 6f, the processing unit can process and obtain a second image shown in FIG. 6d corresponding to the light signals 202 in the second direction, a third image shown in FIG. 6e corresponding to light signals in a third direction, and a fourth image shown in FIG. 6f corresponding to light signals in a fourth direction.

Optionally, the first image, the second image, the third image, and the fourth image may be obtained by extracting and processing from the original image in FIG. 6b.

Figure 6G:
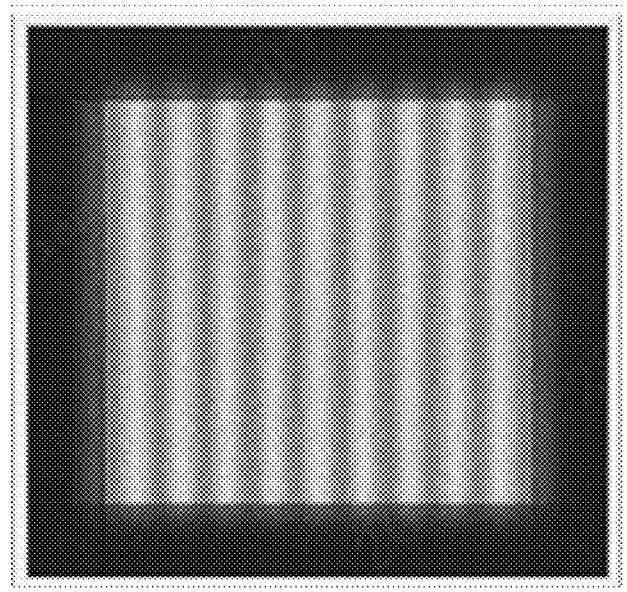

Optionally, the first image, the second image, the third image, and the fourth image are respectively moved by a distance of several numbers of pixels in the image. For example, the first image is moved to the left and up by a distance of several image pixels, the second image is moved to the right and up by a distance of several pixels, the third image is moved to the left and down by a distance of several pixels, and the fourth image is moved to the right and down by a distance of several pixels, and the four images are processed and reconstructed to form a clear image as shown in FIG. 6g.

It should be understood that the image in FIG. 6a is similar to shapes of a fingerprint ridge and a fingerprint valley in a fingerprint image. When a light signal received by the fingerprint detection apparatus 20 is a light signal reflected or scattered by a finger, an image obtained by a processing unit before reconstruction can be similar to the images shown in FIGS. 6b to 6f, and a fingerprint image obtained after reconstruction can be similar to the image shown in FIG. 6g, which is a clear fingerprint image.

The technical solution of fingerprint detection based on the fingerprint detection apparatus 20 described above can solve the problem that a vertical light signal has a poor detection and identification effect on a dry finger, reduce exposure time of a lens, and increase a field of view of the fingerprint detection apparatus.

In addition, in the technical solution of fingerprint detection of the fingerprint detection apparatus 20, the four images corresponding to the light signals in the four directions obtained by processing need to be moved by a distance of several image pixels to synthesize a clear image. When a finger is placed on a display screen, and a distance between the display screen and the fingerprint detection apparatus is constant, a detection light path of the fingerprint detection apparatus remains unchanged, and the moving image pixel distance of the four images remains unchanged. However, in a case that an installation distance between the fingerprint detection apparatus and the display screen changes when a mobile phone is used by a user and encounters a strong impact, or the installation distance between the fingerprint detection apparatus and the display screen fluctuates in a mass production process, the moving image pixel distance of the four images changes. If the moving pixel distance of the four images cannot be automatically calibrated when the installation distance changes, a reconstructed image will be blurred, a signal-to-noise ratio of the image will decrease, and a contrast ratio will deteriorate. As a result, an identification effect of a fingerprint detection and identification system deteriorates, and user experience is affected.

Based on this, the present application proposes a fingerprint detection apparatus that can automatically calibrate a reconstructed image when an installation distance between the fingerprint detection apparatus and a display screen changes, so that the reconstructed image is displayed clearly, and a fingerprint detection and identification effect and user experience are improved.

Hereinafter, a fingerprint detection apparatus according to an embodiment of the present application will be described in detail with reference to FIGS. 7 to 14.

It should be noted that for ease of understanding, the same structure is denoted by the same reference sign in embodiments illustrated below, and detailed description of the same structure is omitted for brevity.

Figure 7:
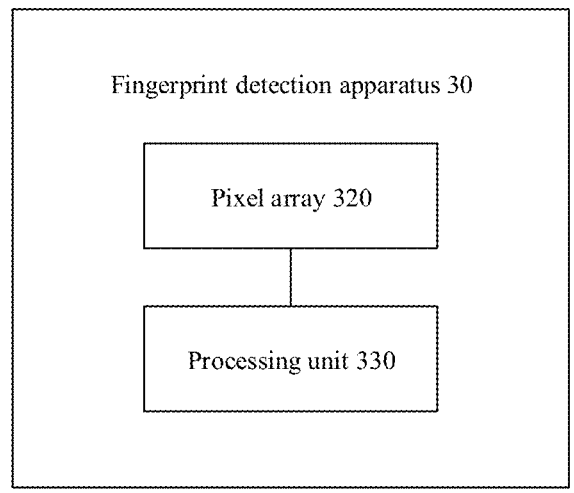
FIG. 7 is a schematic block diagram of a fingerprint detection apparatus according to an embodiment of the present application.

FIG. 7 is a schematic structural diagram of a fingerprint detection apparatus 30 provided in an embodiment of the present application, where the fingerprint detection apparatus 30 is configured to be disposed below a display screen of an electronic device.

As shown in FIG. 7, the fingerprint detection apparatus 30 includes:

a pixel array 320 including a plurality of groups of pixels, the plurality of groups of pixels being configured to respectively receive light signals in multiple directions to obtain multiple images; and a processing unit 330 configured to move the multiple images for combination to form a reconstructed image, and adjust moving distances of the multiple images according to a quality parameter of the reconstructed image to form a target reconstructed image.

Specifically, one group of pixels in the plurality of groups of pixels are used to receive light signals in one of the multiple directions to obtain one of the multiple images.

For example, the pixel array 320 includes four groups of pixels, where a first group of pixels are used to receive light signals in a first direction and convert the light signals into a first group of electrical signals, and the first group of electrical signals are used to form a first image; similarly, the second group of pixels are used to receive light signals in a second direction and convert the light signals into a second group of electrical signals, and the second group of electrical signals are used to form a second image; a third group of pixels are used to receive light signals in a third direction to form a third image, and a fourth group of pixels are used to receive light signals in a fourth direction to form a fourth image.

Optionally, the number of pixels in each group of pixels in the plurality of groups of pixels is equal, and therefore, the number of image pixel points of the multiple images is equal.

Optionally, the plurality of pixels in each group of pixels in the plurality of groups of pixels are not adjacent to each other. Specifically, the plurality of groups of pixels comprise a first group of pixels, and a plurality of first pixels in the first group of pixels are not adjacent to each other, and the plurality of first pixels in the first group of pixels are adjacent to other pixels in the plurality of groups of pixels other than the first group of pixels.

Figure 8:
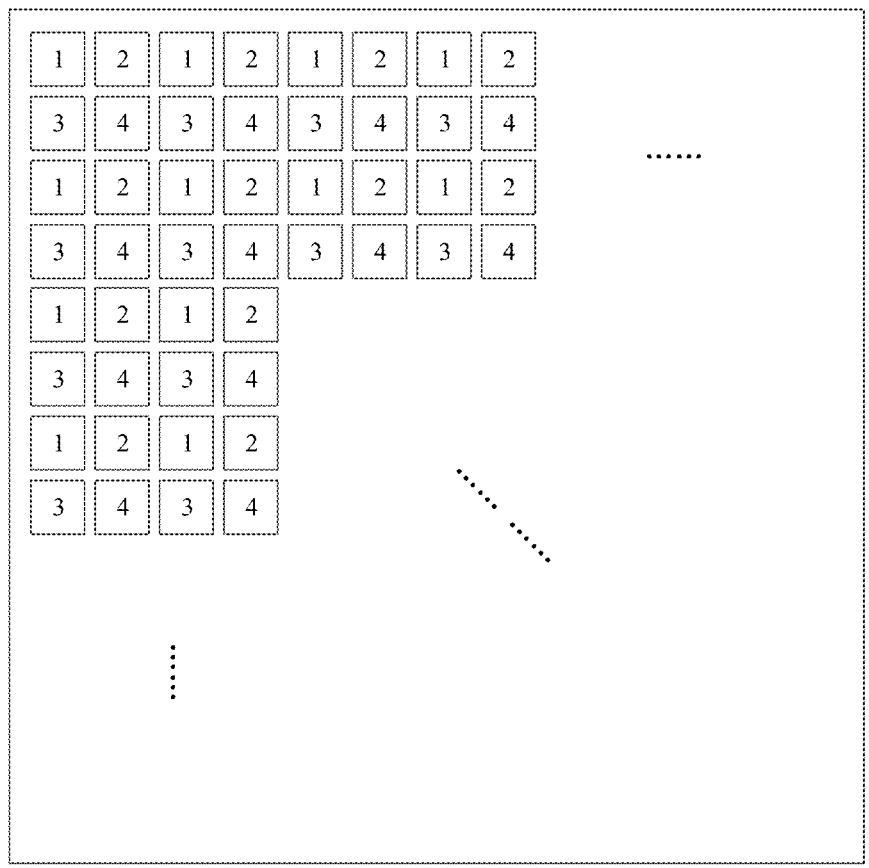
FIG. 8 is a pixel arrangement manner of a pixel array according to an embodiment of the present application.

For example, FIG. 8 shows a pixel arrangement manner of a pixel array 320. As shown in FIG. 8, each pixel in a first group of pixels is identified as "1", each pixel in a second group of pixels is identified as "2", each pixel in a third group of pixels is identified as "3", and each pixel in a fourth group of pixels is identified as "4". Among them, each "1", each "2", each "3" and each "4" are not adjacent to each other, and each "1" is adjacent to "2", "3", and "4".

Optionally, each group of pixels in the plurality of groups of pixels are arranged in the same manner in the plurality of groups of pixels. For example, as shown in FIG. 8, the first group of pixels, the second group of pixels, the third group of pixels, and the fourth group of pixels are arranged in the same manner in the plurality of groups of pixels, and are arranged in spaced arrays.

It should be understood that the plurality of groups of pixels in the pixel array 320 include, but are not limited to, four groups of pixels, and may also be nine groups of pixels or any other groups of pixels, which is not limited in the embodiment of the present application. Correspondingly, the light signals received by the pixel array 320 include, but are not limited to, light signals in four different directions, and may also be light signals in nine different directions. The types of directions of the light signals received by the pixel array 320 are the same as the number of groups of pixels in the pixel array 320.

Figure 9:
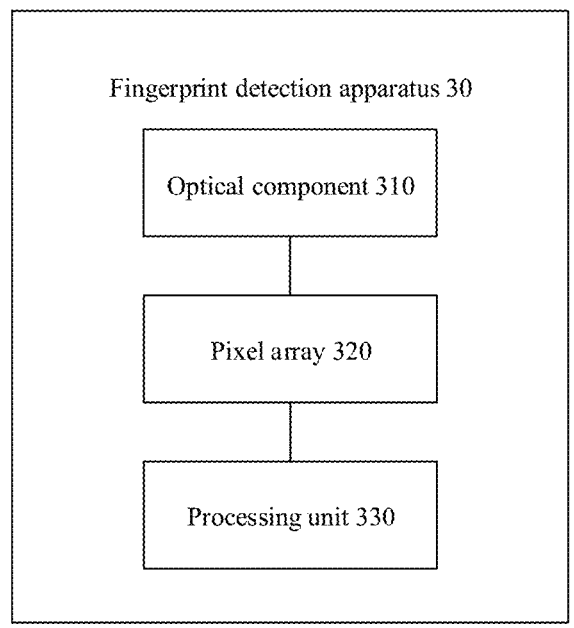
FIG. 9 is a schematic block diagram of another fingerprint detection apparatus according to an embodiment of the present application.

Optionally, as shown in FIG. 9, the fingerprint detection apparatus 30 further includes: an optical component 310, where the optical component 310 is configured to receive light signals in multiple directions, and transmit the light signals in the multiple directions to the pixel array 320.

In a possible implementation manner, the optical component 310 may include a micro lens array 311 and at least one light shielding layer 312;

the at least one light shielding layer 312 is configured to form light directing channels in multiple directions to transmit the light signals in the multiple directions to the pixel array; and the micro lens array 311 is configured to converge and transmit the light signals in the multiple directions to the light directing channels in the multiple directions.

Optionally, a plurality of pixels and light directing channels in multiple directions may be correspondingly provided below each micro lens in the micro lens array 311, where one pixel is provided at an end of a light directing channel, and the number of light directing channels are the same as the number of pixels. The plurality of pixels are respectively one of the plurality of groups of pixels in the pixel array 320, and are used to receive light signals in different directions, that is, the plurality of pixels below each micro lens are used to receive light signals in multiple directions through light directing channels in multiple directions. For example, when the plurality of groups of pixels are four groups of pixels, light directing channels in four different directions are correspondingly disposed below each micro lens, one pixel is provided at an end of each light directing channel, and four pixels below each micro lens receive light signals in four different directions.

Optionally, the micro lens array 311 may be the aforementioned micro lens array 210, and the at least one light shielding layer may include the first light shielding layer 220, the second light shielding layer 230, and the third light shielding layer 260. The pixel array 320 may be the aforementioned pixel array 240.

It should be understood that, in the embodiment of the present application, as an example, light directing channels in four different directions and four pixels are provided below each micro lens, and the four pixels are used to receive light signals in four directions. When other numbers of light directing channels and pixels are provided below each micro lens, reference may be made to the case where the number is four, which is not repeated in the embodiment of the present application.

Optionally, the processing unit 330 may be a processor, the processor may be a processor in the fingerprint detection apparatus 30, the pixel array 320 and the processing unit 330 are both located in the fingerprint detection apparatus, and the processor may be a microcontroller unit (MCU). The processor may also be a processor in an electronic device where the fingerprint detection apparatus 20 is located, such as a main control chip in a mobile phone, etc., which is not limited in the embodiment of the present application.

Specifically, in the process where the processing unit 330 moves the multiple images for combination to form the reconstructed image, the multiple images are images of multiple detection regions, and there is an overlapping detection region between the multiple detection regions. Therefore, the multiple images all include an image of the overlapping detection region.

The detection region may be a region on a surface of the display screen. When a finger is pressed on the surface of the display screen, the detection region is a region on a surface of the finger, and the multiple images are fingerprint images of different surface regions of the finger. Similarly, when other graphic patterns are provided on the surface of the display screen, the detection regions are different regions on the graphic patterns provided on the surface of the display screen, and the multiple images are images of part or all of the graphic patterns.

Optionally, in addition to a human finger, other patterns such as a dot pattern or a light and dark stripe pattern may also be provided on the overlapping detection region, and the multiple images all include a dot image or a light and dark stripe image.

For example, the pixel array 320 includes four groups of pixels. When the pixel array 320 receives light signals in four directions, the processing unit 330 can process four groups of electrical signals obtained by converting the four groups of pixels to obtain four clear images, which are a first image, a second image, a third image, and a fourth image, respectively, where the first image is an image formed by light signals in a first direction of a first detection region 301, the second image is an image formed by light signals in a second direction of a second detection region 302, the third image is an image formed by light signals in a third direction of a third detection region 303, and the fourth image is an image formed by light signals in a fourth direction of a fourth detection region 304.

It should be noted that the light signals in the first direction of the first detection region 301 are light signals formed before light enters the fingerprint detection apparatus 30, where the light is reflected or scattered by the first detection region, and then passes through the display screen. Similarly, the light signals in the second direction of the second detection region, the light signals in the third direction of the third detection region, and the light signals in the fourth direction of the fourth detection region may also have the same meanings.

Figure 10A:
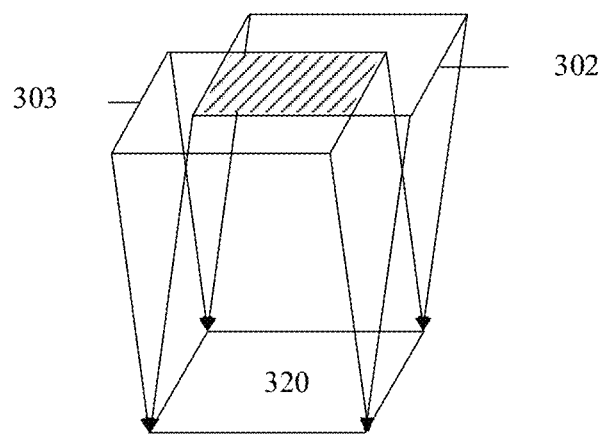

FIG. 10a is a schematic diagram of stereo imaging of the second detection region 302 and the third detection region 303. As shown in FIG. 10a, the pixel array 320 receives the light signals in the second direction reflected by the second detection region 302 and converts the light signals into a second group of electrical signals, and receives the light signals in the third direction reflected by the third detection region 303 and converts the light signals into a third group of electrical signals; and the processing unit 330 may further process the second group of electrical signals to obtain a second image, and process the third group of electrical signals to obtain a third image.

Figure 10B:
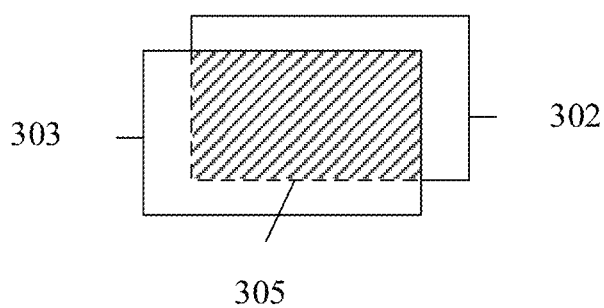

FIG. 10b is a top view of the second detection region 302 and the third detection region 303. As shown in FIG. 10b, there is a first overlapping region 305 between the second detection region 302 and the third detection region 303. Therefore, the second image and the third image also correspondingly include an image of the first overlapping region 305.

Likewise, similar to the second detection region 302 and the third detection region 303, the pixel array 320 receives the light signals in the first direction reflected by the first detection region 301 and converts the light signals into a first group of electrical signals, and receives the light signals in the fourth direction reflected by the fourth detection region 304 and converts the light signals into a fourth group of electrical signals, and the processing unit 330 may further process the first group of electrical signals to obtain a first image, and process the fourth group of electrical signals to obtain a fourth image.

Figures 10C, 11A, 11B, 11C, 11D:
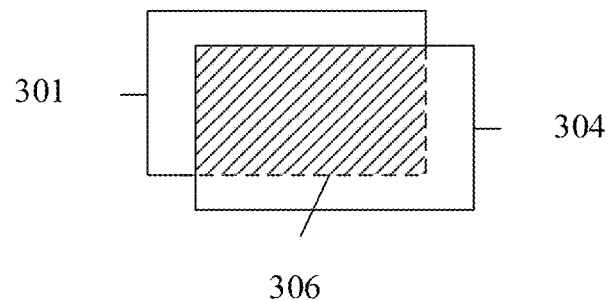

FIG. 10c is a top view of the first detection region 301 and the fourth detection region 304. As shown in FIG. 10c, there is a second overlapping region 306 between the first detection region and the fourth detection region. Therefore, the first image and the fourth image also correspondingly include an image of the second overlapping region 306.

Optionally, the second overlapping region 306 and the first overlapping region 305 may be different regions that overlap each other.

Preferably, the second overlapping region 306 and the first overlapping region 305 are the same region on the display screen. At this time, four images all include an image of the same overlapping region.

Further, the processing unit moves multiple images of the multiple detection regions, and performs combination and reconstruction to form a reconstructed image.

Optionally, the multiple images are moved by a distance of N image pixel points in an X direction and/or a Y direction in a two-dimensional plane for combination to form the reconstructed image, where N is a positive integer.

Specifically, the moving distance is in units of image pixel points, and when an image is moved in the X direction and/or the Y direction, the moving distance is an integer multiple of a distance of a pixel point in the X direction and/or the Y direction.

Therefore, moving an image can mean moving the image by a distance of N image pixel points in the X direction and/or the Y direction. Adjusting the moving distance of an image may also be understood as adjusting the N.

Specifically, the multiple images are moved by the distance of N image pixel points in the X direction and/or the Y direction in the two-dimensional plane to obtain an overlapping image region, and image pixel points of the multiple images located in the overlapping image region are sequentially intersected as pixel points of the reconstructed image to form the reconstructed image.

In addition, optionally, relative positional relationships of all pixel points of each image in the multiple images in the reconstructed image are the same as those in each original image.

Optionally, the number of pixel points of the reconstructed image is the sum of the number of pixel points of the multiple images.

For example, the reconstructed image is formed by combining and reconstructing four images. FIGS. 11a to 11d show schematic diagrams of pixel points of four images. Description is made by an example that the four images are all images with 4×4 pixel points, where a pixel point in a first image is identified as "1", a pixel point in a second image is identified as "2", a pixel point in a third image is identified as "3", and a pixel point in a fourth image is identified as "4".

Figures 11E, 11F, 12A:
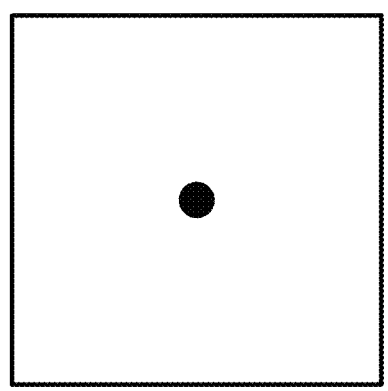

If all regions in the four images overlap, and an image at this time is an original image as shown in FIG. 11e. The original image is an image with 16×16 pixel points. Since the four images are images of four different detection regions, adjacent pixel points of the original image come from pixel points of different images, that is, from different regions. At this time, the original image is a blurry image.

If it is desired to overlap a part of regions of the four images, at least one of the four images is moved so that the part of regions of the four images overlap.

For example, if it is desired to overlap regions of the four images within dashed frames in FIGS. 11a to 11d, a reconstructed image is as shown in FIG. 11f, and the reconstructed image is an image with 16×16 pixel points. Optionally, the pixel point position of the first image is kept unchanged, and the second image is moved to the right by one image pixel point, so that dashed frame regions of the first image and the second image overlap, and then pixel points of the first image and pixel points of the second image in an overlapping region are intersected as pixel points of the reconstructed image. Similarly, the third image is moved down by one image pixel point, and the fourth image is moved to the right and down by one image pixel point respectively, so that dashed frame regions of the third image and the fourth image overlap with the dashed frame regions of the first image and the second image, and pixel points of the third image and pixel points of the fourth image in an overlapping region are intersected as pixel points of the reconstructed image.

It should be understood that there are many manners of moving multiple images. It is possible to move multiple images so that part of the multiple images overlap, or move part of the multiple images so that part regions of the multiple images overlap. The embodiment of the present application does not specifically limit the manner of moving multiple images.

It should also be understood that when an overlapping image region in multiple images is of an image of the same detection region, adjacent image pixel points in the overlapping region of the reconstructed image represent images of the same or similar position points on the detection region. For example, in FIG. 11f, when every four adjacent image pixel points "1", "2", "3" and "4" represent images at the same position point in the detection region, the reconstructed image at this time is a target reconstructed image, which is the reconstructed image with the best image quality, and has the highest contrast, signal-to-noise ratio, and the highest similarity to those of multiple images.

In the embodiment of the present application, the processing unit 330 may adjust the moving distances of the multiple images according to the quality parameter of the reconstructed image to form the target reconstructed image.

Specifically, the quality parameter of the reconstructed image includes, but is not limited to: contrast of the reconstructed image, sharpness of the reconstructed image, signal-to-noise ratio of the reconstructed image, or similarity between the reconstructed image and the multiple images.

Optionally, adjusting the moving distances of the multiple images may be adjusting the number of moving image pixel points of the multiple images. When the moving distances of the multiple images are a distance of N image pixel points, the N may be adjusted according to the quality parameter of the reconstructed image to form the target reconstructed image.

By adjusting the number of moving pixel points of the multiple images, under different moving manners, different reconstructed images of multiple images in different overlapping image regions are obtained, and image quality parameters of different reconstructed images are different. Specifically, the different moving manners mean that the moving manner of at least one of the multiple images changes.

Optionally, in a possible implementation manner, the target reconstructed image is a reconstructed image whose quality parameter is greater than or equal to a first quality threshold.

The first quality threshold includes, but is not limited to: a first contrast threshold of the reconstructed image, a first sharpness threshold of the reconstructed image, a first signal-to-noise ratio threshold of the reconstructed image, or a first similarity threshold between the reconstructed image and the multiple images.

For example, by setting the first contrast threshold of the reconstructed image, and adjusting the moving distances of the multiple images one or more times, one or more reconstructed images are obtained, and when the contrast of the reconstructed image is greater than or equal to the set first contrast threshold, the reconstructed image at this time is the target reconstructed image. Optionally, the first contrast threshold may be 100 or other values.

It should be understood that a method of using one or more of the first sharpness threshold, the first signal-to-noise ratio threshold, or the first similarity threshold to determine that the target reconstruction image is obtained is similar to the above method of using the first contrast threshold to determine that the target reconstructed image is obtained, which is not repeatedly described here.

Optionally, in another possible implementation manner, the target reconstructed image is a reconstructed image with the greatest quality parameter.

And the greatest quality parameter includes, but is not limited to, the greatest contrast, the greatest sharpness, the greatest signal-to-noise ratio, or the greatest similarity with the multiple images.

Specifically, the multiple images are moved for combination to form a first reconstructed image, and the moving distances of the multiple images are adjusted multiple times according to a quality parameter of the first reconstructed image to form multiple second reconstructed images, and quality parameters of the multiple second reconstructed images are compared to obtain the target reconstructed image with the greatest quality parameter.

For example, the multiple images are moved by a first moving distance to obtain a first reconstructed image and its quality parameter, such as contrast, and then the multiple images are moved by a second moving distance to obtain a second reconstructed image and its quality parameter; the quality parameter of the second reconstructed image is compared with the quality parameter of the first reconstructed image, and a third moving distance is obtained according to the comparison result, the first moving distance, and the second moving distance, and the multiple images are moved again by the third moving distance to obtain another second reconstructed image; and by repeating the above method, multiple second reconstructed images are obtained, and quality parameters of the multiple second images are compared to obtain the reconstructed image with the greatest quality parameter as the target reconstructed image.

Optionally, when the light and dark stripe pattern shown in FIG. 6a is provided on the display screen, the four images in the embodiment of the present application may be the same as the four images shown in FIGS. 6c to 6f and include an image of the same stripe region. The target reconstructed image obtained by moving the four images for reconstruction can be the same as that of FIG. 6g, which is a clear stripe image. At this time, the target reconstructed image has the greatest contrast and signal-to-noise ratio, the optimal sharpness, and the highest similarity with any one of the four images, and thus the image quality is the best.

Optionally, when a dot pattern shown in FIG. 12a is provided on the display screen, and the dot pattern is located on the overlapping detection region, the four images in the embodiment of the present application are shown in FIGS. 12b to 12e, and the four images all include a dot pattern. Among them, in a first image, the dot pattern is located at the upper left of the center point of the image; in a second image, the dot pattern is located at the upper right of the center point of the image; in a third image, the dot pattern is located at the lower left of the center point of the image; and in a fourth image, the dot pattern is located at the lower right of the center point of the image. The four images are overlapped to obtain a target reconstructed image as shown in FIG. 12f, and a dot image in the target reconstructed image has the smallest diameter and the best image quality.

Optionally, when a human finger is provided on the display screen, the four images in the embodiment of the present application may be similar to the four light and dark stripe images shown in FIGS. 6a to 6f, wherein stripes in the four stripe images correspond to a fingerprint ridge and a fingerprint valley in the finger, and can exhibit an image corresponding to a fingerprint pattern. Therefore, the target reconstructed image corresponding to the human finger can also be similar to the stripe image in FIG. 6g, which is a clear fingerprint image.

In addition, when the target reconstructed image is formed, the moving distances of multiple images at this time are target moving distances. The target moving distances of the multiple images can be stored and recorded in the fingerprint detection apparatus 30, or stored and recorded in an electronic device where the fingerprint detection apparatus 30 is located, in particular, it may be stored in a storage unit of the fingerprint detection apparatus 30 or the electronic device, such as a memory.

It is worth noting that, in the fingerprint detection apparatus 30, the target movement distance of the multiple images for obtaining the target reconstructed image is related to the distance between the detection region and the fingerprint detection apparatus 30. In other words, when a distance between the detection region and the fingerprint detection apparatus 30 in a vertical direction is a first distance, the multiple images are moved by a first moving distance, and combined and reconstructed to obtain the target reconstructed image whose quality parameter is the greatest or greater than the first quality parameter. If the first distance remains unchanged, the target moving distance of the reconstructed target image obtained is unchanged, and if the first distance changes, the target moving distance of the reconstructed target image obtained also changes accordingly.

If the electronic device where the fingerprint detection apparatus 30 is located vibrates, causing the vertical distance between the fingerprint detection apparatus 30 and the display screen to change, the moving distances of the multiple images need to be adjusted to obtain the target reconstructed image and further new target moving distances.

Figure 13:
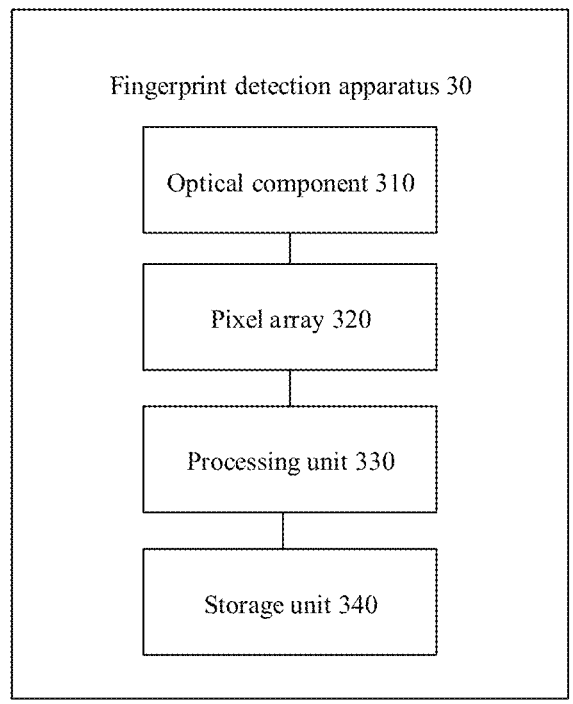
FIG. 13 is a schematic block diagram of another fingerprint detection apparatus according to an embodiment of the present application.

Optionally, FIG. 13 shows a schematic block diagram of another fingerprint detection apparatus 30.

As shown in FIG. 13, the fingerprint detection apparatus 30 may further include a storage unit 340 configured to store at least one reference reconstructed image whose quality parameter is less than or equal to a second quality threshold.

Optionally, the storage unit 340 may also store the target moving distances of the multiple images.

If the quality parameter of the reconstructed image is less than or equal to the quality parameter of the reference reconstructed image, the processing unit 330 is configured to adjust the moving distances of the multiple images according to the quality parameter of the reconstructed image to form the target reconstructed image.

In the embodiment of the present application, the second quality threshold includes, but is not limited to: a second contrast threshold of the reconstructed image, a second sharpness threshold of the reconstructed image, a second signal-to-noise ratio threshold of the reconstructed image, or a second similarity threshold between the reconstructed image and the multiple images.

For example, by setting the second contrast threshold of the reconstructed image, when the contrast of the reconstructed image is less than or equal to the set second contrast threshold, it needs to start adjusting the moving distances of the multiple images according to the quality parameter of the reconstructed image. When the contrast of the reconstructed image is greater than the set second contrast threshold, there is no need to adjust the moving distances of the multiple images. Optionally, the second contrast threshold may be 50 or other values.

It should be understood that a method of using one or more of the second sharpness threshold, the second signal-to-noise ratio threshold, or the second similarity threshold to determine whether the moving distances of multiple images need to be adjusted is similar to the above method of using the second contrast threshold to determine whether the moving distances of multiple images need to be adjusted, which is not repeatedly described here.

Optionally, the electronic device where the fingerprint detection apparatus 30 is located may also include an accelerometer for determining whether a vertical distance between the fingerprint detection apparatus 30 and the display screen changes, and if so, the processing unit 330 is configured to adjust the moving distance of at least one of the multiple images according to the quality parameter of the reconstructed image to form the target reconstructed image.

Specifically, when the accelerometer determines whether the vertical distance between the fingerprint detection apparatus 30 and the display screen changes, a first message is sent to the processing unit 330; and in response to the first message, the processing unit 330 adjusts the moving distances of the multiple images according to the quality parameter of the reconstructed image to form the target reconstructed image.

The above embodiments mainly describe in detail the situation that the detection region of the fingerprint detection apparatus 30 is located on the surface of the display screen. The above embodiments may be applied to a stage when the fingerprint detection apparatus 30 or the electronic device where the fingerprint detection apparatus 30 is located is in a hand of a user, or may be applied to a factory calibration stage. When vibration of the electronic device causes the fingerprint detection apparatus to displace, or a factory installation distance tolerance is large, the moving distances of multiple images may be adjusted with respect to different positions of the fingerprint detection apparatus, so that a clear target reconstructed image with the best quality can be obtained.

In addition to being located on the surface of the display screen, the detection region of the fingerprint detection apparatus 30 may also be located on a light-emitting layer of the display screen. It can be mainly applied to the factory calibration stage of the fingerprint detection apparatus 30.

In this case, the light signals in the multiple directions are light signals from multiple detection regions, and the multiple detection regions also include an overlapping detection region. A dot pattern, a light and dark stripe pattern, or other patterns may be provided on the overlapping detection region, and the multiple images all include a dot image or a light and dark stripe image.

Optionally, the dot pattern may be a dot pattern formed by lighting a pixel in the light-emitting layer, for example, a green dot pattern formed by lighting a green pixel. Similarly, the light and dark stripe pattern may also be a stripe pattern formed by lighting multiple rows or multiple columns of pixels in the light-emitting layer at intervals.

It should be understood that, in the embodiment of the present application, the multiple images also correspond to the light signals in the multiple directions. In the embodiment of the present application, the process of forming multiple images and the process of processing multiple images may refer to the related description in the above-mentioned embodiment of the application, which is not repeatedly described here.

It should be noted that in the embodiment of the present application, when the moving distances of the multiple images are adjusted according to the quality parameter of the reconstructed image to form the target reconstructed image, the first target moving distance is obtained. The first target moving distance is not equal to the target moving distance obtained when the detection region is located on the surface of the display screen in the above embodiment of the application.

In the embodiment of the present application, the target moving distance needs to be calculated according to the first target moving distance and a distance between the light-emitting layer in the display screen and the surface of the display screen, and the target moving distance is stored and recorded in the fingerprint detection apparatus.

Figure 14:
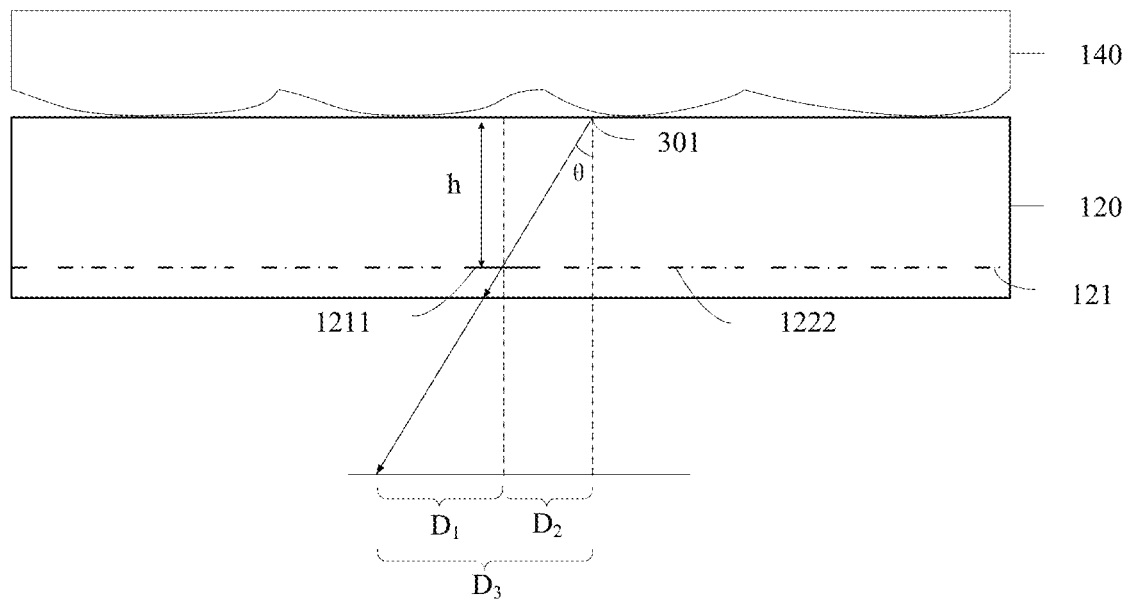
FIG. 14 is a schematic diagram of a relationship between a moving distance of an image corresponding to a light signal in one direction and a position of a display screen according to the present application.

FIG. 14 shows a schematic diagram of a relationship between a moving distance of an image corresponding to a light signal in one direction and a position of a display screen.

As shown in FIG. 14, a distance between a light-emitting layer 121 in a display screen 120 and a surface of the display screen is h. When a detection region is located in the light-emitting layer 121, the light-emitting layer 121 lights up one pixel 1211, while the other pixels are not lit up. For example, a pixel 1222 in the figure is not lit up, and a light signal in a first direction emitted by the lit pixel 1211 is received by a pixel array of a fingerprint detection apparatus 30 to obtain a first image, and an angle between the light signal in the first direction and a vertical direction is θ.

Since the light signal in the first direction is a light signal in a tilt direction, if an image corresponding to the lit pixel in the first image is moved directly below the lit pixel, the image needs to be moved by a first target moving distance $D_1$.

When the detection region is located on the surface of the display screen, the light signal in the first direction corresponding to the above lit pixel comes from a first detection region 301. If an image in the first image corresponding to the first detection region 301 is moved directly below the first detection region 301, the image needs to be moved by a target moving distance $D_3$.

Therefore, it can be seen from the figure that $D_3=D_1+D_2$, where $D_2=h \times \tan \theta$.

In the embodiment of the present application, the target moving distance is $D_3$, and the target moving distance $D_3$ can be stored and recorded in a storage unit of the fingerprint detection apparatus 30 or an electronic device.

The target moving distance is the sum of the first target moving distance $D_1$ and a second target moving distance $D_2$, where the first target moving distance $D_1$ is a moving distance of each image in the multiple images when the target reconstructed image is formed; and the second target moving distance $D_2$ is a moving distance calculated according to a vertical distance between the surface of the display screen and the light-emitting layer of the display screen.

Optionally, the number of pixels $N_3$ of an image corresponding to $D_3$ may also be stored and recorded in the storage unit. Specifically, if a distance between two adjacent pixels in an image is w, the number of pixels of the image corresponding to $D_1$ is $N_1=D_1/w$, and the number of pixels of the image corresponding to $D_2$ is $N_2=D_2/w=h \times \tan \theta/w$, $N_3=N_1+N_2$.

According to the above embodiment, in a factory stage of a fingerprint detection apparatus, for different installation distances, it is convenient to adjust multiple images by lighting a pixel in a light-emitting layer to obtain a first target moving distance, and to obtain an actual target moving distance through further calculation. Using this method, an image can be adjusted more conveniently in a production stage to obtain a target moving distance.

Optionally, the processing unit 330 may also perform at least one up-sampling on multiple original images obtained by the pixel array to obtain the multiple up-sampled images. In other words, the number of image pixel points of each image in the multiple images is greater than the number of pixels of each group of pixels in the plurality of groups of pixels.

For example, each of the four groups of pixels include 100×100 pixels to obtain four original images of 100×100, and the processing unit 330 upsamples the four images with 100×100 pixels, and the four original images are enlarged into four up-sampled images with 120×120 pixels. The four up-sampled images are combined to form a reconstructed image, and the moving distances are adjusted based on the up-sampled images to obtain a target reconstructed image.

Optionally, in the embodiment of the present application, methods such as nearest neighbor interpolation, bilinear interpolation, mean interpolation, median interpolation, etc. can be used for upsampling, that is, on the basis of the original image pixels, a new elements is inserted between pixel points using an appropriate interpolation algorithm, and the specific up-sampling method may refer to an image up-sampling method in the related prior art, which is not be repeatedly described here.

The multiple up-sampled images are combined to form a reconstructed image, and the moving distances of the multiple up-sampled images are adjusted to obtain the target reconstructed image, which can improve the accuracy of moving and combination and improve the sharpness of the target reconstructed image.

The embodiments of the fingerprint detection apparatus of the present application are described above in detail in conjunction with FIGS. 7 to 14, and embodiments of a fingerprint detection method of the present application are described below in detail in conjunction with FIGS. 15 to 21; and it should be understood that the method embodiments and the apparatus embodiments correspond to each other, and similar description may refer to the description of the apparatus embodiments.

Specifically, a fingerprint detection method 300 includes:

S310: receiving light signals in multiple directions to obtain multiple images, where the light signals in the multiple directions are light signals in multiple specific directions reflected or scattered by a finger above the display screen, and directed by a light path of an optical component.

Optionally, the multiple images are images obtained by a plurality of groups of pixels in a pixel array respectively receiving the light signals in the multiple directions.

The multiple images are moved for combination to form a reconstructed image, and moving distances are adjusted according to a quality parameter of the reconstructed image to form a target reconstructed image, the target reconstructed image being a fingerprint image of the finger for fingerprint identification.

Optionally, step S310 in the fingerprint detection method 300 may correspond to a method executed by using the pixel array 320 in the fingerprint detection apparatus 30 as an execution subject.

Figure 15:
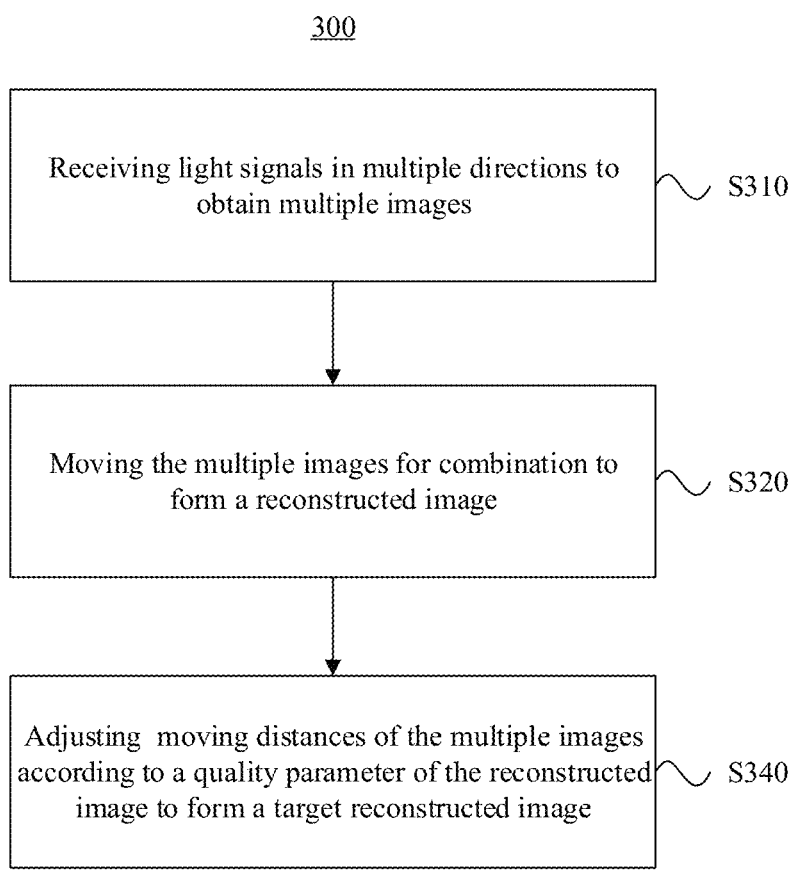
FIG. 15 is a schematic flowchart of a fingerprint detection method according to an embodiment of the present application.

Optionally, FIG. 15 is a schematic flowchart of a fingerprint detection method 300 according to an embodiment of the present application.

As shown in FIG. 15, the fingerprint detection method 300 further includes:

S320: moving the multiple images for combination to form a reconstructed image; and S340: adjusting moving distances of the multiple images according to a quality parameter of the reconstructed image to form a target reconstructed image.

Optionally, step S320 and step S340 in the fingerprint detection method 300 may correspond to a method executed by using the processing unit 330 in the fingerprint detection apparatus as an execution subject.

Optionally, step S320 and step S340 in the fingerprint detection method 300 may also correspond to a method executed by using a processor in an electronic device where a fingerprint detection apparatus is located, for example, a main control chip, as an execution subject.

Optionally, one of the multiple images is an image obtained by a group of pixels in the plurality of groups of pixels receiving a light signal in one of the multiple directions.

Optionally, the number of pixels in each group of pixels in the plurality of groups of pixels is equal.

Optionally, the plurality of groups of pixels include a first group of pixels, and a plurality of first pixels in the first group of pixels are not adjacent to each other, and the plurality of first pixels in the first group of pixels are adjacent to other pixels in the plurality of groups of pixels other than the first group of pixels.

Optionally, each group of pixels in the plurality of groups of pixels are arranged in the same manner in the plurality of groups of pixels.

Optionally, the plurality of groups of pixels are four groups of pixels, the light signals in the multiple directions are light signals in four directions, and the multiple images are four images.

Figure 16:
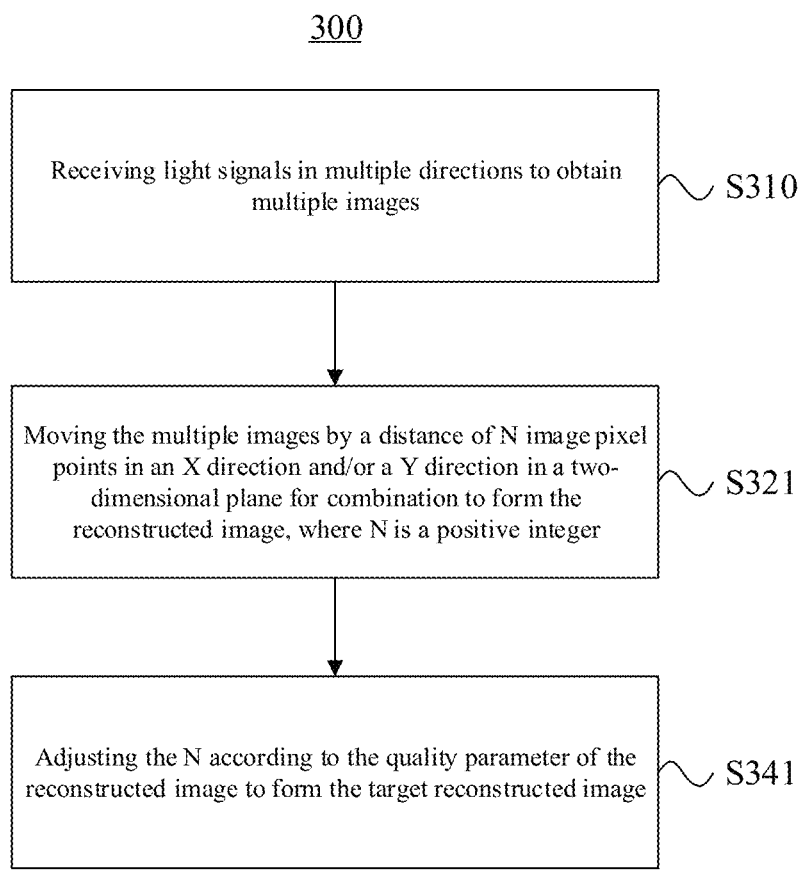
FIG. 16 is a schematic flowchart of another fingerprint detection method according to an embodiment of the present application.

FIG. 16 shows a schematic flowchart of another fingerprint detection method 300.

As shown in FIG. 16, the step S320 may include:

S321: moving the multiple images by a distance of N image pixel points in an X direction and/or a Y direction in a two-dimensional plane for combination to form the reconstructed image, where N is a positive integer.

The step S340 may include:

S341: adjusting the N according to the quality parameter of the reconstructed image to form the target reconstructed image.

Optionally, a specific implementation manner of the step S321 may include:

moving the multiple images by the distance of N image pixel points in the X direction and/or the Y direction in the two-dimensional plane to obtain an overlapping image region, and sequentially intersecting image pixel points of the multiple images located in the overlapping image region as pixel points of the reconstructed image to form the reconstructed image.

Optionally, the number of pixel points of the reconstructed image is the sum of the number of pixel points of the multiple images.

Optionally, relative positional relationships of multiple image pixel points of each image in the multiple images in the reconstructed image are the same as those in the each image.

Optionally, the quality parameter of the reconstructed image includes: contrast, sharpness, signal-to-noise ratio, or similarity.

Optionally, the target reconstructed image is a reconstructed image whose quality parameter is greater than or equal to a first quality threshold.

Optionally, the target reconstructed image is a reconstructed image with the greatest quality parameter.

Figure 17:
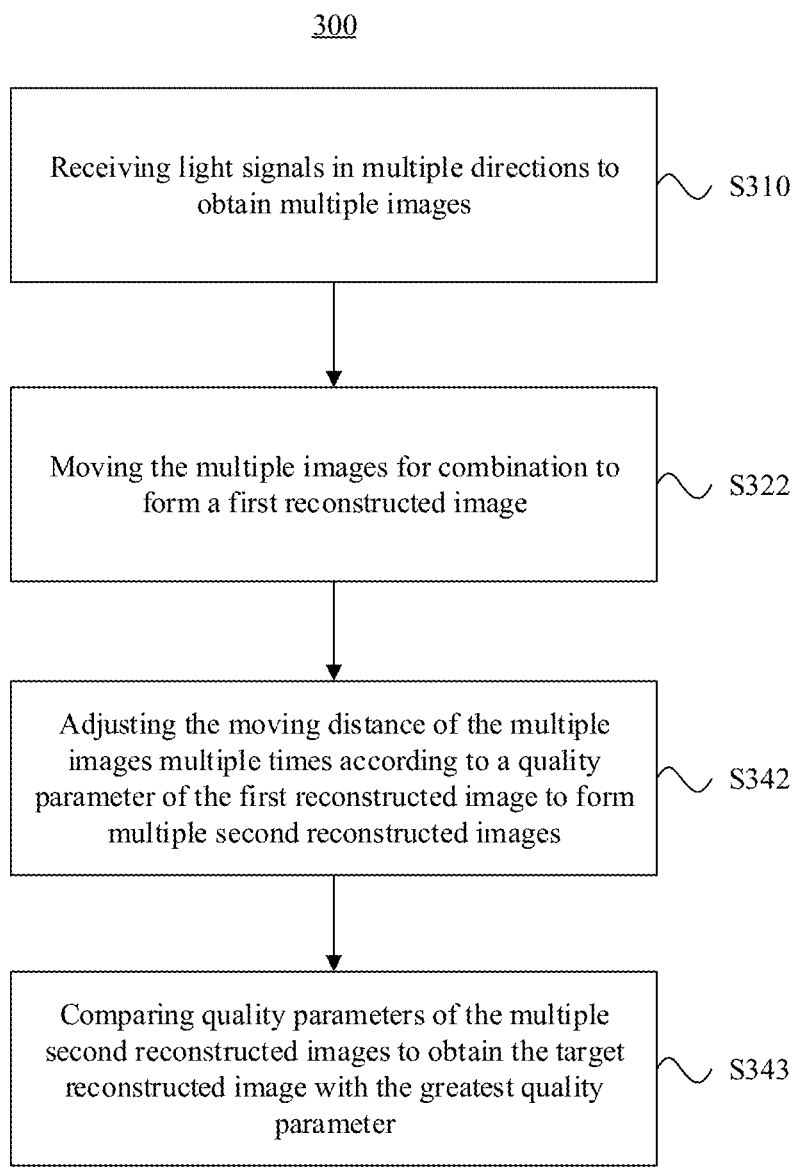
FIG. 17 is a schematic flowchart of another fingerprint detection method according to an embodiment of the present application.

FIG. 17 shows a schematic flowchart of another fingerprint detection method 300.

As shown in FIG. 17, the step S320 may include:

S322: moving the multiple images for combination to form a first reconstructed image.

The step S340 may include:

S342: adjusting the moving distances of the multiple images multiple times according to a quality parameter of the first reconstructed image to form multiple second reconstructed images; and S343: comparing quality parameters of the multiple second reconstructed images to obtain the target reconstructed image with the greatest quality parameter.

Optionally, the light signals in the multiple directions are light signals from multiple first detection regions, and the multiple images are images of the multiple first detection regions, where the multiple first detection regions are provided on a surface of the display screen, and the multiple first detection regions include a first overlapping detection region.

Optionally, a dot pattern, a light and dark stripe pattern, or a human finger is provided on the first overlapping detection region.

Optionally, the formed target reconstructed image is a clear image of the first overlapping detection region.

Figure 18:
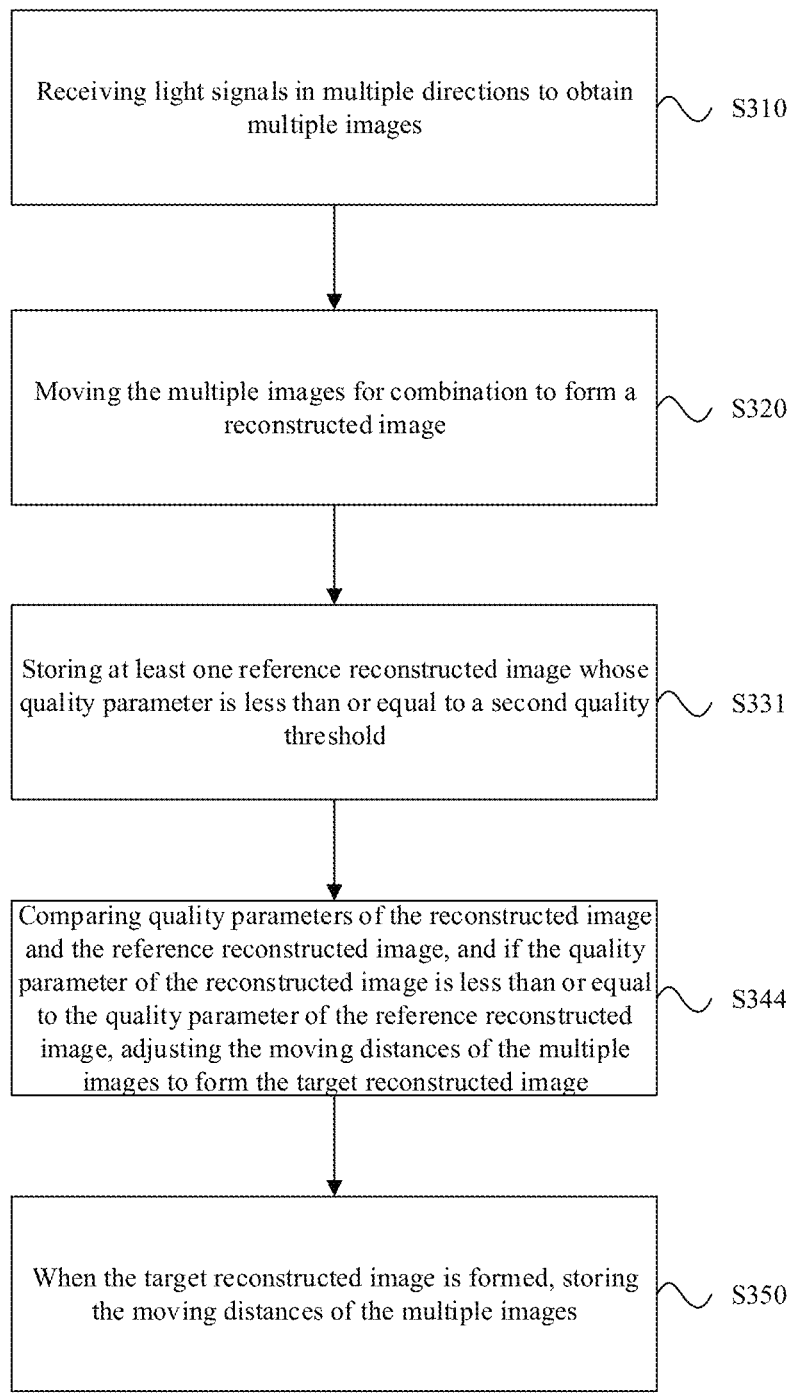
FIG. 18 is a schematic flowchart of another fingerprint detection method according to an embodiment of the present application.

FIG. 18 shows a schematic flowchart of another fingerprint detection method 300.

As shown in FIG. 18, the fingerprint detection method 300 further includes:

S331: storing at least one reference reconstructed image whose quality parameter is less than or equal to a second quality threshold.

The step S340 may include:

S344: comparing quality parameters of the reconstructed image and the reference reconstructed image, and if the quality parameter of the reconstructed image is less than or equal to the quality parameter of the reference reconstructed image, adjusting the moving distances of the multiple images to form the target reconstructed image; and S350: when the target reconstructed image is formed, storing the moving distances of the multiple images.

Figure 19:
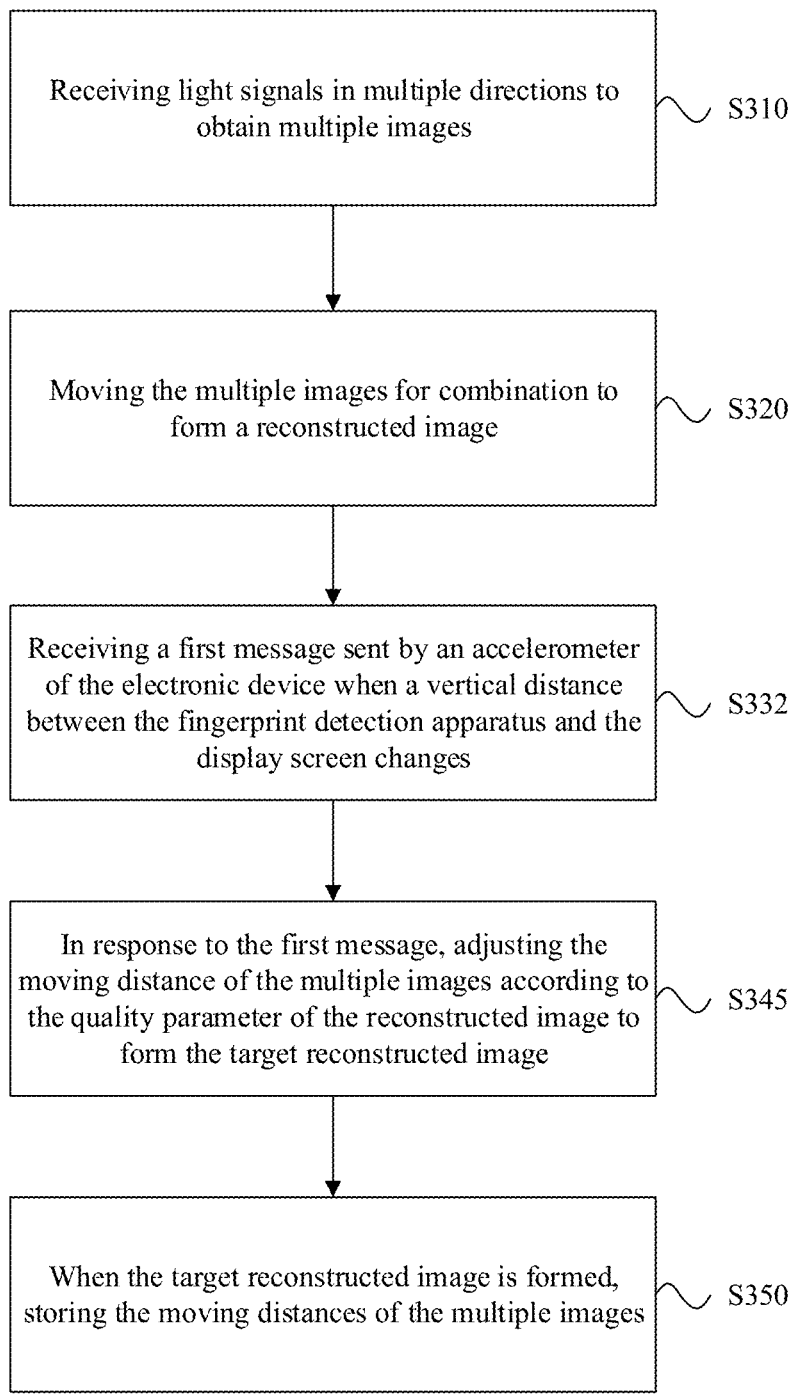
FIG. 19 is a schematic flowchart of another fingerprint detection method according to an embodiment of the present application.

FIG. 19 shows a schematic flowchart of another fingerprint detection method 300.

As shown in FIG. 19, the fingerprint detection method 300 further includes:

S332: receiving a first message sent by an accelerometer of the electronic device when a vertical distance between the fingerprint detection apparatus and the display screen changes.

The step S340 may include:

S345: in response to the first message, adjusting the moving distances of the multiple images according to the quality parameter of the reconstructed image to form the target reconstructed image; and S350: when the target reconstructed image is formed, storing the moving distances of the multiple images.

Optionally, the light signals in the multiple directions are light signals from multiple second detection regions, and the multiple images are images of the multiple second detection regions, where the multiple second detection regions are provided on a light-emitting layer inside the display screen, and the multiple second detection regions include a second overlapping detection region; and a dot pattern or a light and dark stripe pattern is provided on the second overlapping detection region.

Figure 20:
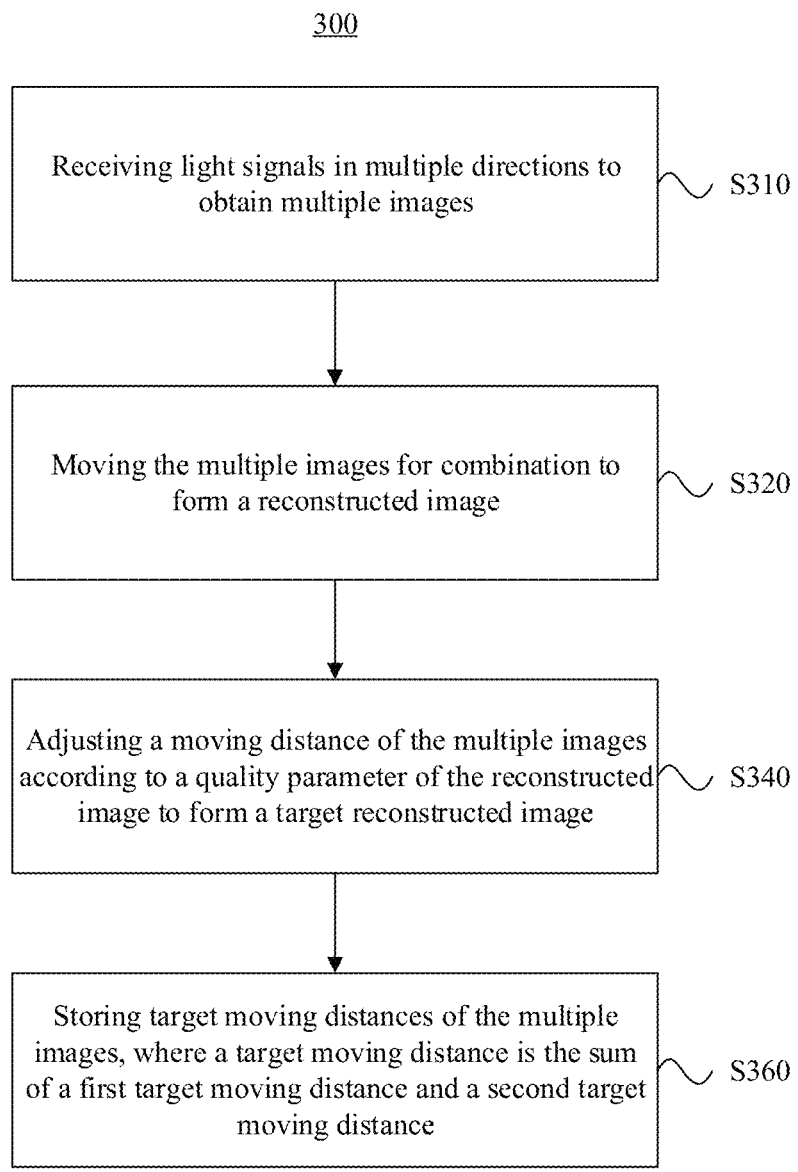
FIG. 20 is a schematic flowchart of another fingerprint detection method according to an embodiment of the present application.

FIG. 20 shows a schematic flowchart of another fingerprint detection method 300.

As shown in FIG. 20, the fingerprint detection method 300 further includes:

S360: storing target moving distances of the multiple images, where a target moving distance is the sum of a first target moving distance and a second target moving distance;

the first target moving distance is a moving distance of each image in the multiple images when the target reconstructed image is formed; and the second target moving distance is a moving distance calculated according to a vertical distance between the surface of the display screen and the light-emitting layer of the display screen.

Figure 21:
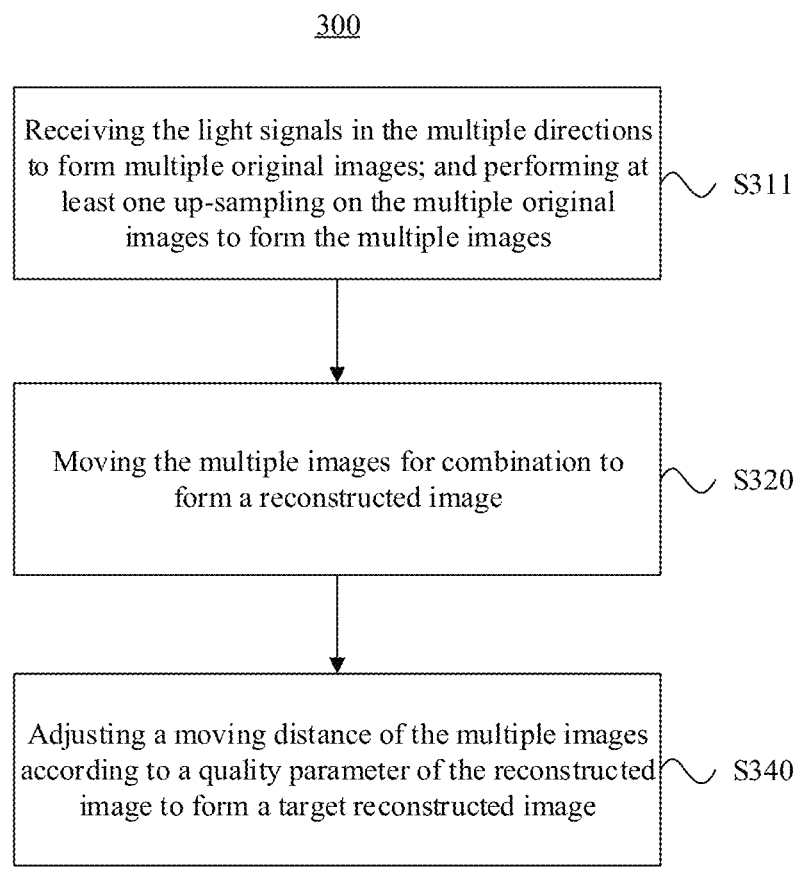
FIG. 21 is a schematic flowchart of another fingerprint detection method according to an embodiment of the present application.

FIG. 21 shows a schematic flowchart of another fingerprint detection method 300.

As shown in FIG. 21, the step S310 includes:

S311: receiving the light signals in the multiple directions to form multiple original images; and performing at least one up-sampling on the multiple original images to form the multiple images.

Figure 22:
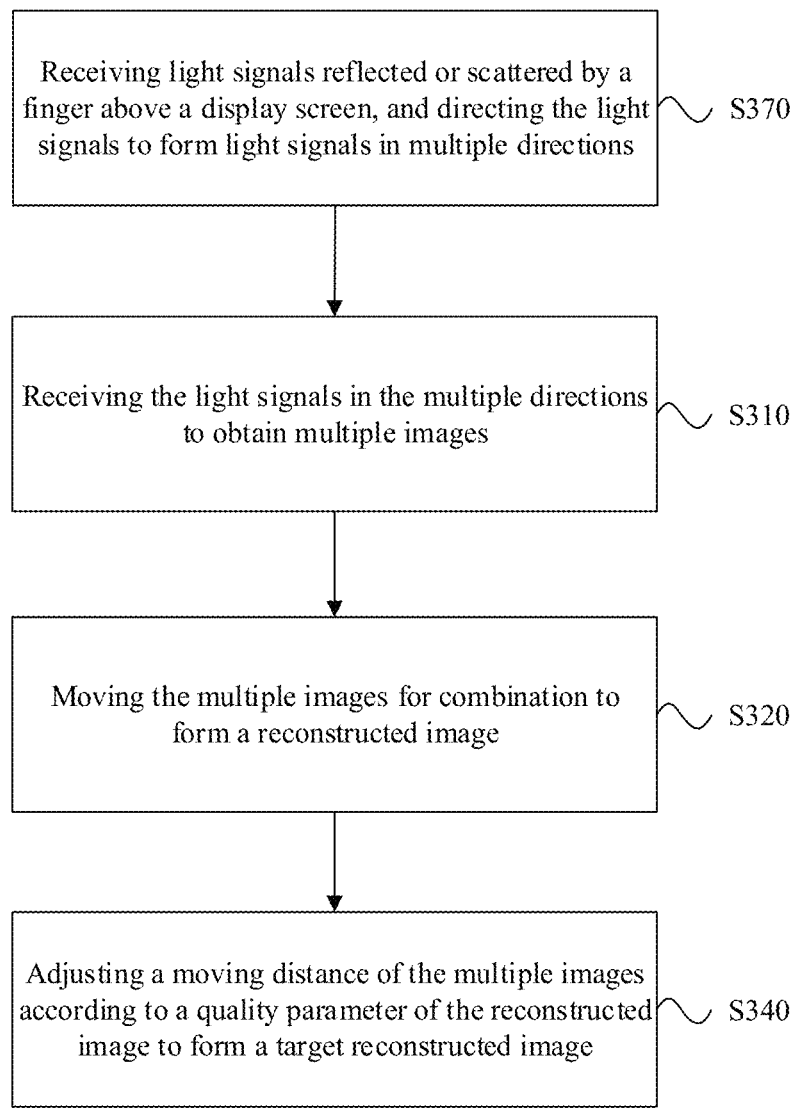
FIG. 22 is a schematic flowchart of another fingerprint detection method according to an embodiment of the present application.

FIG. 22 shows a schematic flowchart of another fingerprint detection method 300.

As shown in FIG. 22, the fingerprint detection method 300 further includes:

S370: receiving light signals reflected or scattered by a finger above a display screen, and directing the light signals to form light signals in multiple directions.

Optionally, the light signals reflected or scattered by the finger are converged and transmitted to light directing channels in multiple specific directions to form the light signals in the multiple directions.

The light signals in the multiple directions can be formed by a micro lens array and at least one light shielding layer in an optical component.

An embodiment of the present application further provides an electronic device, and the electronic device may include a display screen and the fingerprint detection apparatus in the above embodiments of the present application, where the fingerprint detection apparatus is disposed below the display screen to implement under-screen optical fingerprint detection.

The electronic device may be any electronic device having a display screen.

The display screen may use the display screen in the above description, such as an OLED display screen or other display screens. For a description of the display screen, reference may be made to illustration of the display screen in the above description, and for brevity, no further details are provided herein.

It should be understood that the processor of the embodiment of the present application may be an integrated circuit chip with signal processing capability. In an implementation process, steps of the foregoing method embodiments may be completed by using an integrated logical circuit of hardware or an instruction in a form of software in the processor. The processor may be a general purpose processor, a digital signal processor (DSP), an application-specific integrated circuit (ASIC), a field programmable gate array (FPGA) or another programmable logic device, a discrete gate or transistor logic device, or a discrete hardware component. The methods, the steps, and the logical block diagrams disclosed in the embodiments of the present application can be implemented or executed. The general purpose processor may be a microprocessor or the processor may be any conventional processor or the like. Steps of the method disclosed in the embodiments of the present application may be directly executed and completed by using a hardware decoding processor, or may be executed and completed by using a combination of hardware and software modules in the decoding processor. The software module may be located in a mature storage media in the art, such as a random access memory, a flash memory, a read-only memory, a programmable read-only memory or an electrically erasable programmable memory, or a register. The storage medium is located in the memory, and the processor reads information in the memory and completes the steps in the foregoing methods in combination with hardware of the processor.

It may be understood that fingerprint detection apparatus in the embodiments of the present application may further include a memory, which may be a volatile memory or a nonvolatile memory, or may include both a volatile memory and a nonvolatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) that acts as an external cache. By way of example, and not limitation, many forms of RAM are available, such as a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM) and a direct rambus RAM (DR RAM). It should be noted that the memory in the system and the method described herein is intended to include, but is not limited to, these and any other suitable types of memories.

An embodiment of the present application further provides a computer readable storage medium, where the computer readable storage medium stores one or more programs, and the one or more programs include an instruction. When the instruction is executed by a portable electronic device that includes a plurality of application programs, the portable electronic device can execute the method of the embodiments shown in FIGS. 15 to 21.

An embodiment of the present application further provides a computer program including instructions that, when executed by a computer, cause the computer to execute the method of the embodiments shown in FIGS. 15 to 21.

An embodiment of the present application further provides a chip including an input and output interface, at least one processor, at least one memory and a bus, where the at least one memory is configured to store an instruction, and the at least one processor is configured to call an instruction in the at least one memory to execute the method of the embodiments shown in FIGS. 15 to 21.

Those of ordinary skill in the art may be aware that, units and algorithm steps of the examples described in the embodiments disclosed herein may be implemented by electronic hardware, or a combination of computer software and electronic hardware. Whether these functions are performed by hardware or software depends on specific applications and designed constraint conditions of the technical solutions. Persons skilled in the art may use different methods to implement the described functions for every particular application, but it should not be considered that such implementation goes beyond the scope of the present application.

Those skilled in the art to which the present application pertains may clearly understand that, for convenience and simplicity of description, the specific working processes of the system, the apparatus and the units described above, may refer to corresponding processes in the foregoing method embodiments, and will not be repeated redundantly herein.

In the several embodiments provided in the present application, it should be understood that the disclosed system, apparatus, and method may be implemented in another manner. For example, the described apparatus embodiment is merely an example. For example, the unit division is merely logical function division and may be other division in actual implementation. For example, a plurality of units or components may be combined or integrated into another system, or some features may be ignored or not performed. From another point of view, the displayed or discussed mutual coupling or direct coupling or communication connection may be indirect coupling or communication connection via some interfaces, devices or units, and may be in electrical, mechanical or other forms.

The units described as separate components may or may not be physically separate, and components displayed as units may or may not be physical units, may be located in one position, or may be distributed on multiple network units. Some or all of the units may be selected according to actual requirements to achieve the objectives of the solutions of the embodiments.

In addition, functional units in the embodiments of the present application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present application essentially, or the part contributing to the prior art, or some of the technical solutions, may be implemented in a form of a software product. The software product is stored in a storage medium and includes several instructions for instructing a computer device (which may be a personal computer, a server, a network device, or the like) to perform all or some of the steps of the methods described in the embodiments of the present application. The foregoing storage medium includes:

any medium that can store program codes, such as a USB flash drive, a removable hard disk, a read-only memory (ROM), a random access memory (RAM), a magnetic disk, or an optical disc.

The foregoing descriptions are merely specific embodiments of the present application, but the protection scope of the present application is not limited thereto, persons skilled in the art who are familiar with the art could readily think of variations or substitutions within the technical scope disclosed by the present application, and these variations or substitutions shall fall within the protection scope of the present application. Therefore, the protection scope of the present application shall be subject to the protection scope of the claims.

What is claimed is:

1. A fingerprint detection method, applied to a fingerprint detection apparatus disposed below a display screen, comprising:
    receiving light signals in multiple directions to obtain multiple images, wherein the light signals in the multiple directions are light signals in multiple specific directions reflected or scattered by a finger above the display screen, and directed by light paths of an optical component; and
    moving the multiple images for combination to form a reconstructed image, and adjusting moving distances according to a quality parameter of the reconstructed image to form a target reconstructed image, the target reconstructed image being a fingerprint image of the finger for fingerprint identification.

2. The fingerprint detection method according to claim 1, wherein the fingerprint detection apparatus comprises a pixel array comprising a plurality of groups of pixels, each group of pixels in the plurality of groups of pixels are arranged in the same manner in the plurality of groups of pixels and the number of pixels in each group of pixels in the plurality of groups of pixels is equal;
    the multiple images are images obtained by the plurality of groups of pixels in the pixel array respectively receiving the light signals in the multiple directions; and
    one of the multiple images is an image obtained by one group of pixels in the plurality of groups of pixels receiving light signals in one of the multiple directions.

3. The fingerprint detection method according to claim 2, wherein the plurality of groups of pixels comprise a first group of pixels, and a plurality of first pixels in the first group of pixels are not adjacent to each other, and the plurality of first pixels in the first group of pixels are adjacent to other pixels in the plurality of groups of pixels other than the first group of pixels.

4. The fingerprint detection method according to claim 2, wherein the plurality of groups of pixels are four groups of pixels, the light signals in the multiple directions are light signals in four directions, and the multiple images are four images.

5. The fingerprint detection method according to claim 1, wherein the fingerprint detection method further comprises:
    receiving light signals reflected or scattered by the finger above the display screen; and
    converging and transmitting the light signals reflected or scattered by the finger above the display screen to light directing channels in multiple specific directions to form the light signals in the multiple directions.

6. The fingerprint detection method according to claim 1, wherein the moving the multiple images for combination to form the reconstructed image comprises:
    moving an image in the multiple images by a distance of N image pixel points in an X direction and/or a Y direction in a two-dimensional plane for combination to form the reconstructed image, where N is a positive integer.

7. The fingerprint detection method according to claim 6, wherein a moving distance of the image is a distance of N image pixel points, and the adjusting the moving distance according to the quality parameter of the reconstructed image to form the target reconstructed image comprises:
    adjusting the N according to the quality parameter of the reconstructed image to form the target reconstructed image.

8. The fingerprint detection method according to claim 6, wherein the moving the multiple images for combination to form the reconstructed image comprises:
    moving the multiple images by the distance of N image pixel points in the X direction and/or the Y direction in the two-dimensional plane to obtain an overlapping image region, and sequentially intersecting image pixel points of the multiple images located in the overlapping image region as pixel points of the reconstructed image to form the reconstructed image.

9. The fingerprint detection method according to claim 8, wherein the number of pixel points of the reconstructed image is the sum of the number of pixel points of the multiple images, and relative positional relationships of multiple image pixel points of each image in the multiple images in the reconstructed image are the same as those in the each image.

10. The fingerprint detection method according to claim 1, wherein the target reconstructed image is a reconstructed image whose quality parameter is greater than or equal to a first quality threshold, and the quality parameter of the reconstructed image comprises: contrast, sharpness, signal-to-noise ratio, or similarity.

11. The fingerprint detection method according to claim 10, wherein the fingerprint detection method further comprises:
    storing at least one reference reconstructed image whose quality parameter is less than or equal to a second quality threshold; and
    comparing quality parameters of the reconstructed image and the reference reconstructed image, and if the quality parameter of the reconstructed image is less than or equal to the quality parameter of the reference reconstructed image, adjusting the moving distances of the multiple images to form the target reconstructed image.

12. The fingerprint detection method according to claim 11, wherein when the target reconstructed image is formed, the fingerprint detection method further comprises:
    storing the moving distances of the multiple images.

13. The fingerprint detection method according to claim 10, wherein the fingerprint detection method further comprises:
    receiving a first message sent by an accelerometer of the electronic device when a vertical distance between the fingerprint detection apparatus and the display screen changes; and
    in response to the first message, adjusting the moving distances of the multiple images according to the quality parameter of the reconstructed image to form the target reconstructed image.

14. The fingerprint detection method according to claim 1, wherein the target reconstructed image is a reconstructed image with the greatest quality parameter.

15. The fingerprint detection method according to claim 14, wherein the fingerprint detection method further comprises:

moving the multiple images for combination to form a first reconstructed image, and adjusting the moving distances of the multiple images multiple times according to a quality parameter of the first reconstructed image to form multiple second reconstructed images, and comparing quality parameters of the multiple second reconstructed images to obtain the target reconstructed image with the greatest quality parameter.

16. The fingerprint detection method according to claim 1, wherein the light signals in the multiple directions are light signals from multiple first detection regions, and the multiple images are images of the multiple first detection regions, wherein the multiple first detection regions are provided on a surface of the display screen, and the multiple first detection regions comprise a first overlapping detection region.

17. The fingerprint detection method according to claim 16, wherein a dot pattern, a light and dark stripe pattern, or a human finger is provided on the first overlapping detection region, and the target reconstructed image is a clear image of the first overlapping detection region.

18. The fingerprint detection method according to claim 1, wherein the light signals in the multiple directions are light signals from multiple second detection regions, and the multiple images are images of the multiple second detection regions, wherein the multiple second detection regions are provided on a light-emitting layer inside the display screen, and the multiple second detection regions comprise a second overlapping detection region; and a dot pattern or a light and dark stripe pattern is provided on the second overlapping detection region.

19. The fingerprint detection method according to claim 18, wherein the fingerprint detection method further comprises:

storing target moving distances of the multiple images, wherein a target moving distance is the sum of a first target moving distance and a second target moving distance;

the first target moving distance is a moving distance of an image in the multiple images when the target reconstructed image is formed; and the second target moving distance is a moving distance calculated according to a vertical distance between the surface of the display screen and the light-emitting layer of the display screen.

20. The fingerprint detection method according to claim 1, wherein the receiving the light signals in the multiple directions to obtain the multiple images comprises:

receiving the light signals in the multiple directions to form multiple original images; and performing at least one up-sampling on the multiple original images to form the multiple images.

* * * * *